(12) United States Patent
Peng et al.

(10) Patent No.: US 8,007,757 B2
(45) Date of Patent: Aug. 30, 2011

(54) MULTI-DIMENSIONAL COMPLEX NANOCRYSTAL STRUCTURES AND METHODS OF MAKING SAME

(75) Inventors: Xiaogang Peng, Fayetteville, AR (US); Arun Narayanaswamy, Eindhoven (NL); Narayan Pradhan, Balasore (IN)

(73) Assignee: The Board of Trustees of the University of Arkansas, Little Rock, AR (US)

( * ) Notice: Subject to any disclaimer, the term of this patent is extended or adjusted under 35 U.S.C. 154(b) by 1032 days.

(21) Appl. No.: 11/804,215

(22) Filed: May 17, 2007

(65) Prior Publication Data
US 2008/0081016 A1 Apr. 3, 2008

Related U.S. Application Data

(60) Provisional application No. 60/801,179, filed on May 17, 2006.

(51) Int. Cl.
*C01G 11/00* (2006.01)
(52) U.S. Cl. ........ 423/509; 423/605; 423/622; 423/624; 423/594.17; 423/594.19; 977/773; 977/774; 977/775; 977/734; 977/811; 977/813; 977/824
(58) Field of Classification Search ............. 423/594.17, 423/605, 622, 624, 594.19, 509; 977/773–775, 977/734, 811, 813, 824
See application file for complete search history.

(56) References Cited

U.S. PATENT DOCUMENTS

| 6,200,680 B1 * | 3/2001 | Takeda et al. | 428/402 |
| 7,531,149 B2 * | 5/2009 | Peng et al. | 423/1 |
| 2006/0133990 A1 * | 6/2006 | Hyeon et al. | 423/622 |

OTHER PUBLICATIONS

Battaglia, D., Peng, X., "Formation of High Quality InP and InAs Nanocrystals on a Noncoordinating Solvant", Nano Letters 2002, 2, 1027-1030.
Bellamy, L. J., The Infra-red Spectra of Complex Molecules, Chapter 10, "Carboxylic Acids", 3rd ed., Chapman and Hall, New York, 1975, pp. 183-202.
Chen, J., Herricks, T., Xia, Y., "Polyol Synthesis of Platinum Nanostructures: Control of Morphology Through the Manipulation of Reduction Kinetics ", Angewandte Chemie, International Edition 2005, 44, 2589-2592.
Chen, Y., Kim, M., Lian, G., Johnson, M. B., Peng, X., "Side Reactions in Controlling the Quality, Yield, and Stability of High Quality Colloidal Nanocrystals", Journal of the American Chemical Society 2005, 127, 13331-13337.
Cho, K., Koh, H., Park, J., Oh, S. J., Kim, H.-D., Han, M., Park, J. H., Chen, C. T., Kim, Y. D., Kim, J. S., Jonker, B. T., X-ray Absorption Spectroscopy Study of Diluted Magnetic Semiconductors:, Physical Review B: Condensed Matter and Materials Physics 2001, 63, 155203/1-155203/7.
Cho, K.-S., Talapin, D. V., Gaschler, W., Murray, C. B., "Designing PbSe Nanowires and Nanorings Through Oriented Attachment of Nanoparticles", Journal of the American Chemical Society 2005, 127, 7140-7147.
Ederth, J., Johnsson, P., Niklasson, G. A., Hoel, A., Hultaker, A., Heszler, P., Granqvist, C. G., van Doorn, A. R., Jongerius, M. J., Burgard, D., Electrical and Optical Properties of Thin Films Consisting of Tin-doped Indium Oxide Nanoparticles, Physical Review B: Condensed Matter and Materials Physics 2003, 68, 155410/1-155410/10.
Emons, T. T., Li, J., Nazar, L. F., "Syntheses and Characterization of Mesoporous Indium Tin Oxide Possessing an Electronically Conductive Framework", Journal of the American Chemical Society 2001, 124, 8516-8517.
Fresenius, W., Huber, J. F. K., Pungor, E., Rechnitz, G. A., Simon, W., West, T. S., Tables of Spectral Data for Structure Determination of Organic Compounds. Second ed., Springer-Verlag: Berlin, 1989.
Gao, B. Z. J., Zhang, X., Xu, B., "Magnetic-Dipolar-Interaction-Induced Self-Assembly Affords Wires of Hollow Nanocrystals of Cobalt Selenide", Angewandte Chemie International edition 2006, 45, 1220-1223.
Gur, I., Fromer, N. A., Geier, M. L., Alivisatos, A. P., "Air-Stable All-Inorganic Nanocrystal Solar Cells Processed for Solution", Science (Washington, DC, United States) 2005, 310, 462-465.
Huynh, W. U., Dittmer, J. J., Alivisatos, A. P., "Hybrid Nanorod-Polymer Solar Cells", Science (Washington, DC, United States) 2002, 295, 2425-2427.
Jana, N. R., Chen, Y., Peng, X., "Size- and Shape-Controlled Magnetic (Cr, Mn, Fe, Co, Ni) Oxide Nanocrystals via a Simple and General Approach", Chemistry of Materials 2004, 16, 3931-3935.
Kim, S.-R., Hong, H.-K., Kwon, C. H., Yun, D. H., Lee, K., Sung, Y. K., "Ozone Sensing Properties of In2O3-based Semiconductor Thick Films", Sensors and Actuators, B: Chemical 2000, B66, 59-62.
Lee, S.-M., Cho, S.-N., Cheon, J. "Anisotropic Shape Control of Colloidal Inorganic Nanocrystals", Advanced Materials (Weinheim, Germany) 2003, 15, 441-444.
Li, L. S., Pradhan, N., Wang, Y., Peng, X., "High Quality ZnSe and XnS Nanocrystals Formed by Activating Zinc Caroxylate Precursors", Nano Letters 2004, 4, 2261-2264.
Liu, B., Zeng, H. C., "Mesoscale Organization of CuO Nanoribbons: Formation of Dandelions", Journal of the American Chemical Society 2004, 126, 8124-8125.

(Continued)

Primary Examiner — Steven Bos
(74) Attorney, Agent, or Firm — J. Clinton Wimbish; Smith Moore Leatherwood LLP

(57) ABSTRACT

A method of synthesizing nanostructures. In one embodiment, the method includes the step of heating a reaction mixture at an elevated temperature, T, for a period of time effective to allow the growth of desired nanostructures. The reaction mixture contains an amount, P, of a carboxylate salt and an amount, L, of a fatty acid ligand, defining a molar ratio of the fatty acid ligand to the carboxylate salt, $\alpha = L/P$, and a hydrocarbon solvent. The reaction mixture is characterizable with a critical ligand protection, $\mu$, associating with the chemical structure of the carboxylate salt such that when $\alpha < \mu$, the reaction mixture is in a limited ligand protection (LLP) domain, and when $\alpha > \mu$, the reaction mixture is in a sufficient ligand protection (SLP) domain. The nanostructures are formed in the form of single crystalline and nearly monodisperse nanocrystals, which are in the form of dot-shaped nanocrystals, when the reaction mixture is in the SLP domain, and in the form of nanoflowers, when the reaction mixture is in the LLP domain, respectively.

43 Claims, 12 Drawing Sheets

OTHER PUBLICATIONS

Liu, Q., Lu, W., Ma, A., Tang, J., Lin, J., Fang, J., "*Study of Quasi-Monodisperse In2O3 Nanocrystals: Synthesis and Optical Determination*", Journal of the American Chemical Society 2005, 127, 5276-5277.

Manna, L., Milliron, D. J., Meisel, A., Scher, E. C., Alivisatos, A. P., "*Controlled Growth of Tetrapod-Branched Inorganic Nanocrystals*", Nature Materials 2003, 2, 382-385.

Mullin, J. W., Crystallization. 3rd ed., 1997, p. 480.

Murali, A., Barve, A., Leppert, V. J., Risbud, S. H., Kennedy, I. M., Lee, H. W. H., *Synthesis and Characterization of Indium Oxide Nanoparticles*, Nano Letters 2001, 1, 287-289.

Murray, C. B., Norris, D. J., Bawendi, M. G., "*Synthesis and Characterization of Nearly Monodisperse CdE (E=S, Se, Te) Semiconductor Nanocrystallites*", Journal of the American Chemical Society 1993, 115, 8706-15.

Naghavi, N., Marcel, C., Dupont, L., Rougier, A., Leriche, J.-B., Guery, C., "*Structural and Physical Characterization f Transparent Conducting Pulsed Laser Deposited In2O3-ZnO Thin Films*", Journal of Materials Chemistry 2000, 10, 2315-2319.

Neri, G., Bonavita, A., Micali, G., Rizzo, G., Galvagno, S., Niederberger, M., Pinna, N., "*A Highly Sensitive Oxygen Sensor Operating at Room Temperature Based on Platinum-doped In2O3 Nanocrystals*", Chemical Communications (Cambridge, United Kingdom) 2005, (48), 6032-6034.

O'Brien, S., Brus, L., Murray, C. B., "*Synthesis of Monodiperse Nanoparticles of Barium Titanate: Toward a Generalized Strategy of Oxide Nanoparticle Synthesis*", Journal of the American Chemical Society 2001, 123, 12085-12086.

Pacholski, C., Komowski, A., Weller, H., "*Self-Assembly of ZnO: From Nanodots to Nanorods*", Angewandte Chemie, International Edition 2002, 41, 1188-1191.

Peng, X., Manna, U., Yang, W., Wickham, J., Scher, E., Kadavanich, A., Allvisatos, A. P., "*Shape Control of CdSe Nanocrystals*", Nature (London) 2000, 404, 59-61.

Peng, X., Thessing, J. "*Controlled Synthesis of High Quality Semiconductor Nanocrystals*", Structure and Bonding (Berlin, Germany) 2005, 118, (Semiconductor Nanocrystals and Silicate Nanoparticles), 79-119.

Peng, X., Wickham, J., Alivisatos, A. P., "*Kinetics of II-VI and III-V Colloidal Semiconductor Nanocrystal Growth: Focusing of Size Distributions*", Journal of the American Chemical Society 1998, 120, 5343-5344.

Peng, Z. A., Peng, X., "*Nearly Monodisperse and Shape-controlled CdSe Nanocrystals via Alternative Routes: Nucleation and Growth*", Journal of the American Chemical Society 2002, 124, 3343-3353.

Peng, Z. A., Peng, X., "*Formation of High-Quality CdTe, CdSe and CdS Nanocrystals Using CdO As Precursor*", Journal of the American Chemical Society 2001, 123, 183-184.

Penn, R. L., Banfield, J. F., *Imperfect Oriented Attachment: Dislocation Generation in Defect-Free Nanocrystals*, Science (Washington, D. C.) 1998, 281, 969-971.

Pinna, N., Neri, G., Antonietti, M., Niederberger, M., "*Nonaqueous Synthesis of Nanocrystalline Semiconducting Metal Oxides for Gas Sensing*", Angewandte Chemie, International Edition 2004, 43, 4345-4349.

Pradhan, N., Xu, H., Peng, X., "*Colloidal CdSe Quantum Wires by Oriented Attachment*", Nano Letters 2006, 6, 720-724.

Puetz, J., Al-Dahoudi, N., Aegerter, M. A., "*Processing of Transparent Conducting Coatings Made With Redispersible Crystalline Nanoparticles*", Advanced Engineering Materials 2004, 6, 733-737.

Qadri, S. B., Kim, H., "*Synthesis of Bulk In2O3-Sc2O3 and Their Transparent Conducting Oxide Films*", Journal of Applied Physics 2002, 92, 227-229.

Seo, W. S., Jo, H. H., Lee, K., Park, J. T., *Preparation and Optical Properties of Highly Crystalline, Colloidal, and Size-Controlled Indium Oxide Nanoparticles*, Advanced Materials (Weinheim, Germany) 2003, 15, 795-797.

Sigma-Aldrich Catalogue 2005, 1401.

Sun, S., Zeng, H., "*Size-controlled Synthesis of Magnetite Nanoparticles*", Journal of the American Chemical Society 2002, 124, 8204-8205.

Tang, Z., Kotov, N. A., Giersig, M., "*Spontaneous Organization of Single CdTe Nanoparticles into Luminescent Nanowires*", Science (Washington, DC, United States) 2002, 297, 237-240.

Trentler, T. J., Hickman, K. M., Goel, S. C., Viano, A. M., Gibbons, P. C., Buhro, W. E., "*Solution-liquid-Solid Growth of Crystalline III-V Semiconductors: An Analogy to Vapor-Liquid-Solid Growth*", Science (Washington, D. C.) 1995, 270, 1791-94.

Tzitzios, V., Niarchos, D., Gjoka, M., Boukos, N., Petridis, D., "*Synthesis and Characterization of 3D CoPt Nanostructures*", Journal of the American Chemical Society 2005, 127, 13756-13757.

Williams, D. E., *Semiconducting Oxides as Gas-Sensitive Resistors*, Sensors and Actuators, B: Chemical 1999, 57, 1-16.

Yang, H. G., Zeng, H. C., "*Self-Construction of Hollow SnO2 Octahedra Based on Two-Dimensional Aggregation of Nanocrystallites*", Angewandte Chemie, International Edition 2004, 43, 5930-5933.

Yin, M., O'Brien, S., *Synthesis of Monodisperse Nanocrystals of Manganese Oxides*, Journal of the American Chemical Society 2003, 125, 10180-10181.

Yu, J. H., Joo, J., Park, H. M., Baik, S.-I., Kim, Y. W., Kim, S. C., Hyeon, T., *Synthesis of Quantum-Sized Cubic ZnS Nanorods by the Oriented Attachment Mechanism*, Journal of the American Chemical Society 2005, 127, 5662-5670.

Yu, W. W., Wang, Y. A., Peng, X., "*Formation and Stability of Size-, Shape-, and Structure-Controlled CdTe Nanocrystals: Ligand Effects on Monomers and Nanocrystals*", Chemistry of Materials 2003, 15, 4300-4308.

Zhang, D., Liu, Z., Li, C., Tang, T., Liu, X., Han, S., Lei, B., Zhou, C., "*Detection of NO2 Down to ppb Levels Using Individual and Multiple In2O3 Nanowire Devices*", Nano Letters 2004, 4, 1919-1924.

Zitoun, D., Pinna, N., Frolet, N., Belin, C., "*Single Crystal manganese Oxide Multipods by Oriented Attachment*", Journal of the American Chemical Society 2005, 127, 15034-15035.

\* cited by examiner ns involved in the formation of other types of inorganic nanocrystals in the mainstream synthetic chemistry. At present, metal fatty acid salts are the most common precursors used in synthesis of all types of inorganic nanocrystals in non-aqueous media under elevated temperatures. Presumably, thermal stability of these precursors under synthetic conditions is of great importance for designing and understanding any of these synthetic schemes.

MULTI-DIMENSIONAL COMPLEX NANOCRYSTAL STRUCTURES AND METHODS OF MAKING SAME

CROSS-REFERENCE TO RELATED PATENT APPLICATION

This application claims the benefit, pursuant to 35 U.S.C. §119(e), of U.S. provisional patent application Ser. No. 60/801,179, filed May 17, 2006, entitled "MULTI-DIMENSIONAL COMPLEX NANOCRYSTAL STRUCTURES AND METHODS OF MAKING SAME," by Xiaogang Peng, Arun Narayanaswamy, and Narayan Pradham, which is incorporated herein by reference in its entirety.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [5] represents the 5th reference cited in the reference list, namely, Peng, X., Manna, U., Yang, W., Wickham, J., Scher, E., Kadavanich, A., Allvisatos, A. P., Nature (London) 2000, 404, 59-61.

FIELD OF THE INVENTION

The present invention relates generally to nanostructures, and more particularly to single crystalline and monodisperse nanocrystals, and methods of making same.

BACKGROUND OF THE INVENTION

Synthesis of nanocrystals with defined sizes [1-3] and shapes [4-10] has advanced dramatically in recent years. High temperature approaches (roughly 250-350° C.) in organic solvents, either through organometallic schemes [1, 5, 11] or greener approaches [12-14] have played a key role and often been regarded as the mainstream synthetic chemistry in the field. The organometallic and greener approaches are commonly referred to "pyrolysis" or "thermolysis" of the precursors under high temperatures. Emphasis on synthetic chemistry of nanocrystals is currently moving into nanoobjects with complex structures and compositions [15]. Particularly, formation of three-dimensional colloidal nanocrystals has drawn a great deal of attention to researchers.

Development of the mainstream synthetic chemistry for zero dimensional (0D) and one dimensional (1D) structures have been greatly benefited by the mechanistic studies on the growth of nanostructures. However, all these studies are mostly limited to growth kinetics [15], and no systematic information on chemical reaction mechanisms of typical synthetic processes is reported. Such chemical reaction mechanisms may become critical in developing general strategies for synthesis of three dimensional (3D) complex nanostructures, provided the expected complex structures change in the reaction system. Synthetic schemes involved in the formation of oxide nanocrystals is a good starting point for such studies, since the synthetic process is extremely simple, like the thermal treatment of a fatty acid salt in a hydrocarbon solvent [14]. In addition, the chemical reaction information also provides valuable references for understanding reactions involved in the formation of other types of inorganic nanocrystals in the mainstream synthetic chemistry. At present, metal fatty acid salts are the most common precursors used in synthesis of all types of inorganic nanocrystals in non-aqueous media under elevated temperatures. Presumably, thermal stability of these precursors under synthetic conditions is of great importance for designing and understanding any of these synthetic schemes.

The importance of the above mentioned crystal growth mechanism can be illustrated with an example of synthetic chemistry for 1D nanowires, i.e., solution-liquid-solid approaches [4] and 1D oriented attachments [6, 7, 10, 16-18]. For the 1D oriented attachments, the electric dipole moment of the nanocrystals plays a determining role. The dipole moment of a given type of crystal has a given set of possible orientations as indicated by a recent impressive study in Murray's group [10], which generates nanorods/wires and related structures with a given set of orientations.

Nanocrystals with complex 3D structures have widespread applications in solar cells, catalysis, sensing, and other surface/shape related characterizations. For instance, CdTe and other semiconductor tetrapods [21, 22] are ideal structures for fabrication of high performance solar cells [23]. Such tetrapods, however, are typically formed by a traditional path, atom by atom growth from nuclei, and the intrinsic crystal structures play a key role. However, it is not clear how to extend the synthetic methods to different structures. Several reports indicate that nanodots and nanorods can self-assemble into different complex shaped particles [24-26]. Such complex structures, however, are often quite large, fragile, and/or polycrystalline. Other reports indicate possibilities for formation of complex nanostructures through 3D attachments, however, these reports are typically brief, missing clear mechanistic evidences, or structurally not well characterized [27]. Thus, a general pathway to form 3D oriented attachments has not been achieved yet.

Therefore, a heretofore unaddressed need exists in the art to address the aforementioned deficiencies and inadequacies.

SUMMARY OF THE INVENTION

In one aspect, the present invention relates to a method of synthesizing nanostructures. The nanostructures are in the form of single crystalline and nearly monodisperse nanocrystals. The nanostructures in one embodiment, are in the form of dot-shaped nanocrystals having a size in the range of about 1-20 nm, and in another embodiment, are in the form of nanoflowers having a size in the range of about 10-100 nm.

The method, in one embodiment, includes the steps of (a) providing a first mixture and a second mixture, where the first mixture contains an amount, P, of a carboxylate salt, and a first amount of a hydrocarbon solvent, and the second mixture contains an amount of an activation reagent and a second amount of the hydrocarbon solvent; (b) heating the first mixture to a first temperature, T1, and the second mixture to a second temperature, T2, respectively, where T1<T2; (c) injecting the heated first mixture into the heated second mixture at the second temperature T2 to form a reaction mixture; and (d) incubating the reaction mixture for a period of time effective to allow the growth of nanostructures.

In one embodiment, the first temperature T1 is in the range of about 90-180° C., and the second temperature T2 is in the range of about 170-330° C. The period of time effective is in the range of from about 1 minute to about 12 hours.

In one embodiment, the first mixture further contains an amount, L, of a fatty acid ligand, where the fatty acid comprises myristic acid (MA) or stearic acid (SA).

The carboxylate salt includes cobalt acetate hydrate (Co(Ac)$_2$.4H$_2$O), cobalt chloride hydrate (Co(Cl)$_2$.4H$_2$O), cobalt myristate (Co(Mt)$_2$), indium acetate (In(Ac)$_3$), indium myristate (In(Mt)$_3$), indium stearate (In(St)$_3$), manganese acetate hydrate (Mn(Ac)$_2$.4H$_2$O), manganese chloride hydrate (Mn(Cl)$_2$.4H$_2$O), manganese stearate (Mn(St)$_2$), zinc acetate (Zn(Ac)$_2$), or zinc stearate (Zn(St)$_2$). In one embodiment, In(Mt)$_3$ is synthesized by a process comprising the steps of treating an amount of In(Ac)$_3$ with an amount of MA to form a complex; and heating the complex to about 140° C. for about six hours to allow the growth of In(Mt)$_3$ in an argon atmosphere.

The activation reagent comprises alcohol or amine, where the alcohol includes decyl alcohol (DA) or 1-octadecyl alcohol (ODA). The hydrocarbon solvent comprises 1-octadecene (ODE).

In one embodiment, the method further includes the step of degassing the first mixture and the second mixture, respectively. The heating step is performed in an argon atmosphere.

In another aspect, the present invention relates to a method of synthesizing nanostructures, where the nanostructures are in the form of single crystalline and nearly monodisperse nanocrystals. In one embodiment, the method comprises the steps of injecting a first mixture at a first temperature, T1, into a second mixture at a second temperature, T2, to form a reaction mixture, where the first mixture contains a carboxylate salt and a hydrocarbon solvent, and the second mixture contains an activation reagent and the hydrocarbon solvent; and incubating the reaction mixture for a period of time effective to allow the growth of nanostructures.

The first temperature T1 is in the range of about 90-180° C., and the second temperature T2 is in the range of about 170-330° C. The period of time is in the range of from about 1 minute to about 12 hours.

The carboxylate salt, in one embodiment, comprises Co(Mt)$_2$, In(Mt)$_3$, In(St)$_3$, Mn(St)$_2$, or Zn(St)$_2$. The activation reagent comprises alcohol or amine, where the alcohol includes DA or ODA. The hydrocarbon solvent comprises ODE.

In yet another aspect, the present invention relates to a method of synthesizing nanostructures. In one embodiment, the method includes the steps of (a) providing a first mixture and a second mixture, where the first mixture contains an amount, P, of a carboxylate salt, and an amount, L, of a fatty acid ligand and a first amount of a hydrocarbon solvent, where the second mixture contains an amount of an activation reagent and a second amount of the hydrocarbon solvent; (b) heating the second mixture to a first temperature, T1, and the first mixture to a second temperature, T2, respectively, where T1<T2; (c) injecting the heated second mixture into the heated first mixture at the second temperature T2 to form a reaction mixture; and (d) incubating the reaction mixture for a period of time effective to allow the growth of desired nanostructures. In one embodiment, the first temperature T1 is in the range of about 90-180° C., and the second temperature T2 is in the range of about 170-330° C. The period of time is in the range of from about 1 minute to about 12 hours.

The reaction mixture, in one embodiment, is characterizable with a critical ligand protection, $\mu$, associating with the chemical structure of the carboxylate salt, where a molar ratio of the fatty acid ligand to the carboxylate salt is defined by $\alpha$=L/P such that when $\alpha<\mu$, the reaction mixture is in a limited ligand protection (LLP) domain, and when $\alpha>\mu$, the reaction mixture is in a sufficient ligand protection (SLP) domain, respectively.

In one embodiment, the nanostructures are in the form of dot-shaped nanocrystals when the reaction mixture is in the SLP domain. In another embodiment, the nanostructures are in the form of nanoflowers when the reaction mixture is in the LLP domain.

Furthermore, the method may include the step of degassing the first mixture and the second mixture, respectively.

In a further aspect, the present invention relates to a method of synthesizing nanostructures. In one embodiment, the method comprises the step of heating a first mixture to an elevated temperature, T, for a period of time effective to allow the growth of nanostructures, where the first mixture contains a carboxylate salt and a hydrocarbon solvent. In one embodiment, the carboxylate salt comprises Co(Mt)$_2$, In(Mt)$_3$, In(St)$_3$, Mn(St)$_2$, or Zn(St)$_2$. The first mixture may further contain a fatty acid ligand including myristic acid (MA) or stearic acid (SA). The activation reagent comprises alcohol or amine, where the alcohol includes DA or ODA. The hydrocarbon solvent comprises ODE. In one embodiment, the elevated temperature T is in the range of about 170-330° C.

Additionally, the method may include the step of injecting a second mixture into the heated first mixture at the elevated temperature T, where the second mixture contains an activation reagent and the hydrocarbon solvent.

In yet a further aspect, the present invention relates to a method of synthesizing nanostructures. In one embodiment, the method comprises the step of heating a reaction mixture at an elevated temperature, T, for a period of time effective to allow the growth of desired nanostructures, where the reaction mixture contains an amount, P, of a carboxylate salt and an amount, L, of a fatty acid ligand, defining a molar ratio of the fatty acid ligand to the carboxylate salt, $\alpha$=L/P, and a hydrocarbon solvent, where the reaction mixture is characterizable with a critical ligand protection, $\mu$, associating with the chemical structure of the carboxylate salt such that when $\alpha<\mu$, the reaction mixture is in a limited ligand protection (LLP) domain, and when $\alpha>\mu$, the reaction mixture is in a sufficient ligand protection (SLP) domain. The elevated temperature T is in the range of about 170-330° C.

In one embodiment, the carboxylate salt comprises Co(Ac)$_2$.4H$_2$O, Co(Cl)$_2$.4H$_2$O, Co(Mt)$_2$, In(Ac)$_3$, In(Mt)$_3$, In(St)$_3$, Mn(Ac)$_2$.4H$_2$O, Mn(Cl)$_2$.4H$_2$O, Mn(St)$_2$, Zn(Ac)$_2$, or Zn(St)$_2$. The fatty acid ligand includes myristic acid (MA) or stearic acid (SA). The activation reagent comprises alcohol or amine, where the alcohol includes DA or ODA The nanostructures are in the form of single crystalline and nearly monodisperse nanocrystals. When the reaction mixture is in the SLP domain, the nanostructures are in the form of dot-shaped nanocrystals. When the reaction mixture is in the LLP domain, the nanostructures are in the form of nanoflowers. The nanoflowers are changeable to faceted nanodots when the reaction mixture is continuously heated to a temperature substantially higher then the elevated temperature T, for a period of time effective.

In one aspect, the present invention relates to nanostructures synthesized according to the above-disclosed methods.

In another aspect, the present invention relates to a synthetic nanostructure comprising a reaction product of a plurality of chemical reactions in sequence according to the formulae of:

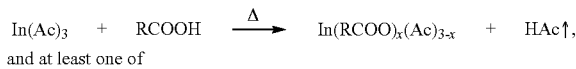

and at least one of

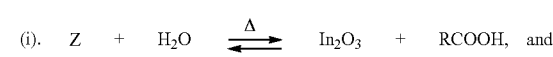

-continued

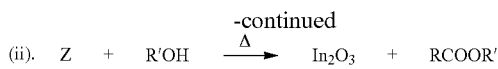

where Z comprises $In(RCOO)_x(Ac)_{3-x}$ or $In(RCOO)_3$. The plurality of chemical reactions takes place at an elevated temperature, T, for a period of time effective to allow the reaction product to form, where the reaction product is $In_2O_3$.

The chemical reaction (i) is a hydrolysis process that is reversible, where the chemical reaction (ii) is an alcoholysis process that is irreversible.

In one embodiment, the elevated temperature T is in the range of about 170-330° C. The period of time effective is in the range of from about 1 minute to 12 hours.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
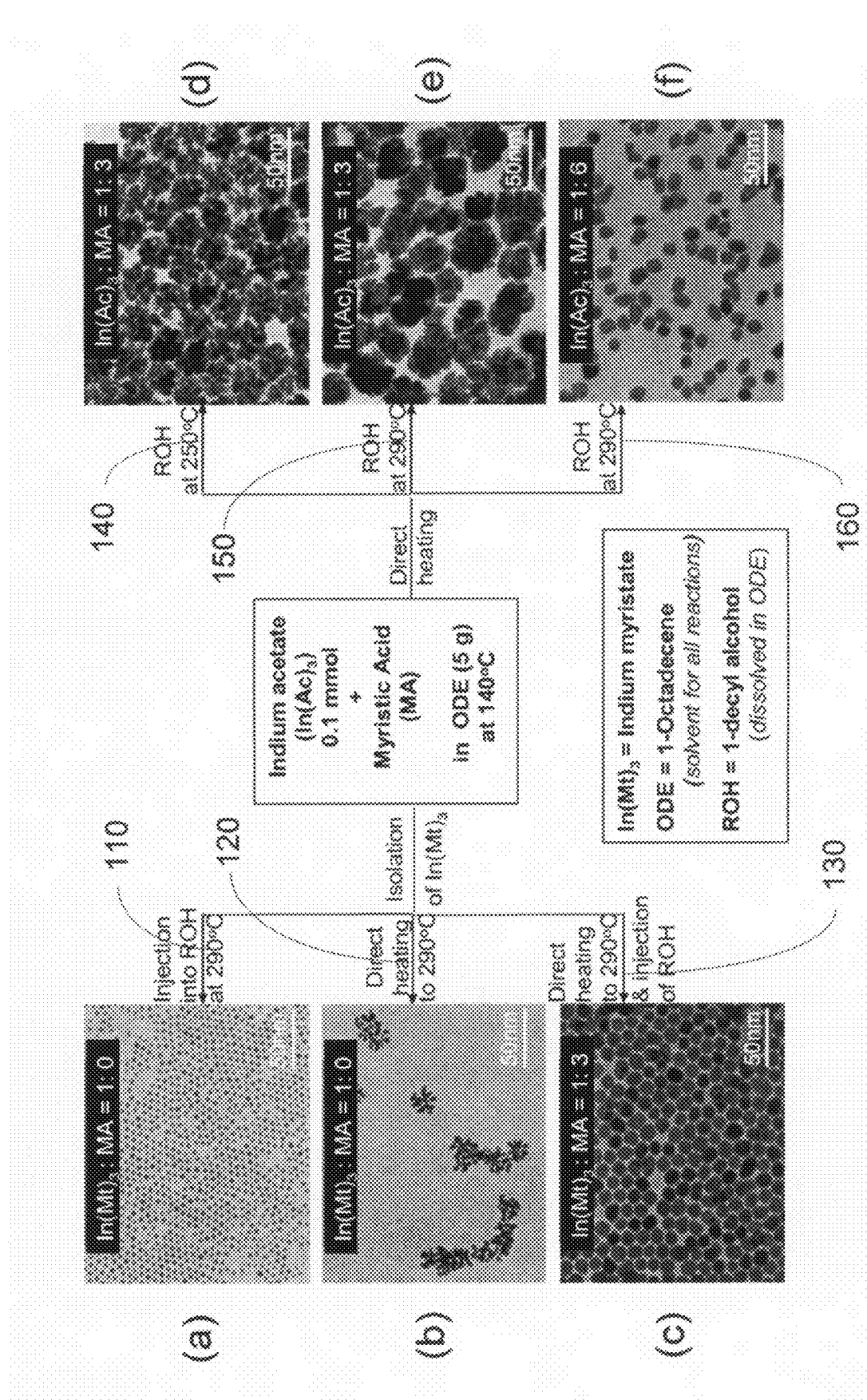
FIG. 1 shows schematic reaction schemes and representative TEM images (a)-(f) of the resulting nanocrystals according to embodiments of the present invention.

The present invention is more particularly described in the following examples that are intended as illustrative only since numerous modifications and variations therein will be apparent to those skilled in the art. Various embodiments of the invention are now described in detail. Referring to the drawings of FIGS. 1-12, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

DEFINITIONS

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "about" or "approximately" shall generally mean within 20 percent, preferably within 10 percent, and more preferably within 5 percent of a given value or range. Numerical quantities given herein are approximate, meaning that the term "about" or "approximately" can be inferred if not expressly stated.

As used herein, the term "hydrolysis" refers to a chemical reaction or process in which a chemical compound reacts with water. This is the type of reaction that is used to break down polymers. Water is added in this reaction.

As used herein, the term "alcoholysis" refers to a chemical reaction involving an ester exchange or the process of reacting an ester with an alcohol. The cleavage of a C—C bond is formed by the addition of an alcohol.

As used herein, the term "pyrolysis" refers to a chemical decomposition of organic materials by heating in the absence of oxygen or any other reagents, except possibly steam.

OVERVIEW OF THE INVENTION $In_2O_3$ and related materials, such as indium tin oxide (ITO), are the most frequently used transparent conductors [28-32] and commercialized hosts for various sensing devices [20, 33-36]. $In_2O_3$ nanocrystals improve the performance in these major types of applications. Implementation of $In_2O_3$ nanocrystals can reduce the fabrication costs of transparent conductors. These nanomaterials, especially 3D nanoflowers, can also offer substantially large surface area for sensing. The present invention, among other things, discloses systems and approaches of synthesizing single crystalline and nearly monodisperse nanocrystals including nanodots and nanoflowers.

The systems use indium carboxylate salts as the precursors with or without alcohol as the activating reagents in a hydrocarbon solvent under elevated temperatures. It is identified that timited-ligand-protection (LLP) leads to three-dimensional (3D) oriented attachment of nanodots, resulting in 3D nanoflowers. When the systems have sufficient ligand protection (SLP) for the nanocrystals, nanodots are found to be the stable products. The sizes of nearly monodisperse nanodots and nanoflowers are varied in a range of about 1-20 nm and of about 10-100 nm, respectively. The simple reaction systems make it possible to have a systematic study of the reaction mechanisms along with the growth kinetics of nanocrystals. Similar approaches are frequently referred to as pyrolysis or thermolysis of precursors under elevated temperatures, however, the actual reaction pathways according to the present invention are hydrolysis and alcoholysis. Both nearly monodispersed nanodots and nanoflowers can be formed through either of the reaction pathways. Using either of the reaction pathways, a reaction system can be tuned to generate monodisperse nanodots or nanoflowers with different sizes by simply varying the degree of ligand protection for the nanocrystals. Specifically, formation of nanoflowers through 3D oriented-attachment was observed in a limited-ligand-protection (LLP) domain, while the reaction in the traditional sufficient ligand protection domain yields high quality nanodots. Hydrolysis is found as a reversible pathway and alcoholysis is confirmed to be irreversible. Consequently, a sufficient amount of alcohol is able to force the yield of nanocrystals, both nanodots and nanoflowers, to unity.

The present invention in one aspect relates to a method of synthesizing nanostructures. The method includes the step of separately preparing a first mixture and a second mixture. The first mixture contains an amount, P, of a carboxylate salt and a first amount of a hydrocarbon solvent. The carboxylate salt includes, but are not limited to, one of cobalt acetate hydrate $(Co(Ac)_2.4H_2O)$, cobalt chloride hydrate $(Co(Cl)_2.4H_2O)$, cobalt myristate $(Co(Mt)_2)$, indium acetate $(In(Ac)_3)$, indium myristate $(In(Mt)_3)$, indium stearate $(In(St)_3)$, manganese acetate hydrate $(Mn(Ac)_2.4H_2O)$, manganese chloride hydrate $(Mn(Cl)_2.4H_2O)$, manganese stearate $(Mn(St)_2)$, zinc acetate $(Zn(Ac)_2)$, zinc stearate $(Zn(St)_2)$, and the like. The hydrocarbon solvent includes 1-octadecene (ODE). Other hydrocarbon solvent can also be utilized to practice the present invention. The first mixture may further contain an amount, L, of a fatty acid ligand, such as myristic acid (MA) or stearic acid (SA). The second mixture contains an amount of an activation reagent and a second amount of the hydrocarbon solvent. The activation reagent includes amine or alcohol, for example, decyl alcohol (DA) or 1-octadecyl alcohol (ODA).

The first mixture and the second mixture are degassed and heated to a first temperature, T1, and a second temperature, T2, respectively, in an argon atmosphere, where T1<T2. The first temperature T1 is in the range of about 90-180° C., and the second temperature T2 is in the range of about 170-330° C.

Then the heated first mixture is swiftly injected into the heated second mixture at the second temperature T2 to form a reaction mixture that is incubated for a period of time effective to allow the growth of desired nanostructures. The period of time is in the range of from about 1 minute to about 12 hours.

The reaction mixture can be characterized with a critical ligand protection, μ, associating with the chemical structure of the carboxylate salt. A molar ratio of the fatty acid ligand to the carboxylate salt is defined by α=L/P such that when α<μ, the reaction mixture is in a limited ligand protection (LLP) domain, and when α>μ, the reaction mixture is in a sufficient ligand protection (SLP) domain.

The nanostructures as formed according to the present invention are in the form of single crystalline and nearly monodisperse nanocrystals. Specifically, the nanostructures are in the form of dot-shaped nanocrystals, when the reaction mixture is in the SLP domain, while the nanostructures are in the form of nanoflowers, when the reaction mixture is in the LLP domain.

Another aspect of the present invention relates to a method of synthesizing nanostructures. The method includes the step of separately preparing the first and second mixture as disclosed above. However, the first mixture and the second mixture are degassed and heated to the second temperature, T2, and the first temperature, T1, respectively, in an argon atmosphere. The heated second mixture is then injected into the heated first mixture at the second temperature T2 to form a reaction mixture that is incubated for a period of time effective to allow the growth of desired nanostructures.

An alternative aspect of the present invention relates to a method of synthesizing nanostructures in the form of single crystalline and nearly monodisperse nanocrystals. The method includes the step of heating a reaction complex at an elevated temperature, T, where the reaction complex contains an amount, P, of a carboxylate salt and an amount, L, of a fatty acid ligand, defining a molar ratio of the fatty acid ligand to the carboxylate salt, α=L/P, and is characterizable with a critical ligand protection, μ, associating with the chemical structure of the carboxylate salt such that when α<μ, the reaction complex is in a limited ligand protection (LLP) domain, and when α>μ, the reaction complex is in a sufficient ligand protection (SL P) domain. The nanostructures are in the form of dot-shaped nanocrystals, when the reaction complex is in the SLP domain, and in the form of nanoflowers, when the reaction complex is in the LLP domain.

The present invention in one aspect also relates to nanostructures synthesized according to the method as disclosed above.

In another aspect, the present invention relates to a synthetic nanostructure comprising a reaction product of several chemical reactions in sequence according to the formulae of:

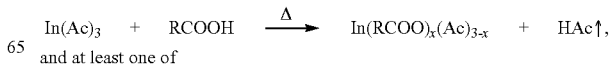

and at least one of

-continued

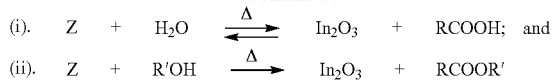

where Z comprises $In(RCOO)_x(Ac)_{3-x}$ or $In(RCOO)_3$. The chemical reactions take place at an elevated temperature, T, for a period of time effective to allow the reaction product to form. The reaction product is $In_2O_3$. The chemical reaction (i) is a hydrolysis process that is reversible, and wherein the chemical reaction (ii) is an alcoholysis process that is irreversible.

In one aspect, the present invention relates to a system for synthesizing nanostructures including single crystalline and nearly monodisperse nanocrystals. The system has a reaction mixture containing an amount, P, of a carboxylate salt and an amount, L, of a fatty acid ligand, defining a molar ratio of the fatty acid ligand to the carboxylate salt, $\alpha=L/P$, and a hydrocarbon solvent, and means for heating the reaction mixture at an elevated temperature, T, for a period of time effective to allow the growth of desired nanostructures.

The reaction mixture can be characterized with a critical ligand protection, $\mu$, associating with the chemical structure of the carboxylate salt such that when $\alpha<\mu$, the reaction mixture is in a limited ligand protection (LLP) domain, and when $\alpha>\mu$, the reaction mixture is in a sufficient ligand protection (SLP) domain. When the system starts with an insufficient amount of ligands, below the critical ligand concentration for stabilization of individual nanocrystals at a given temperature, the freshly formed primary nanocrystals undergo 3D aggregation. The insufficient surface ligand coverage provides the needed kinetic driving force for 3D oriented attachment.

Therefore, the key issue for designing a system which is capable of generating both monodisperse nanodots and 3D complex structures is to identify the critical ligand protection point. This point is determined by the concentration and bulkiness of the ligands. Above the critical ligand protection point, monodisperse and stable nanodots can be yielded as the sole product. Below such a critical point, the freshly formed nanodots with high free surface energy rapidly become unstable after they are formed because of LLP. Subsequently, they aggregate to form 3D objects. The high surface free energy might further drive the primary nanocrystals to undergo oriented attachment to form the 3D aggregates, if the enthalpic gain dominates the entropic loss as discussed above.

These and other aspects of the present invention are more specifically described below.

IMPLEMENTATIONS AND EXAMPLES OF THE INVENTION

Without intent to limit the scope of the invention, exemplary methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Example 1

Formation of Nearly Monodisperse $In_2O_3$ Nanodots and Oriented-Attached Nanoflowers: Hydrolysis and Alcoholysis vs. Pyrolysis Experimental Procedures Materials: Indium acetate ($In(Ac)_3$), myristic acid (MA), stearic acid, decyl alcohol and 1-octadecene (ODE, tech 90%) were purchased from Aldrich. 1-Octadecyl alcohol (ODA) was purchased from Alfa Aesar. All chemicals were used without further purification.

Synthesis of Indium Myristate ($In(Mt)_3$): In an exemplary embodiment, about 10 mmol of $In(Ac)_3$ was treated with about 40 mmol of MA to form a mixture that is heated to about 140° C. in an argon atmosphere. The mixture was heated for about 6 hours and then the reaction product was isolated by addition of acetone. The resulting precipitate was filtered, dried and again treated with about 40 mmol of MA to ensure complete conversion of acetate to myristate. The final product, $In(Mt)_3$, was washed several times with acetone to remove excess MA, dried and used as a precursor. The product was characterized by FTIR and $^1$H NMR.

Synthesis of indium Stearate ($In(St)_3$): The synthetic method was similar to the one for $In(Mt)_3$, except MA was replaced by stearic acid (SA).

Synthesis of $In_2O_3$ Nanoflowers and Shape Transition: In one reaction, about 0.1 mmol of $In(Ac)_3$, 0.3 mmol of MA and 5 g of ODE were loaded in a 25 mL three-necked flask to form a mixture thereof. The mixture was degassed and heated to about 250° C. in an argon atmosphere. Within about 5 minutes of reaching 250° C., the reaction mixture became slightly turbid. About 0.3 mmol of decyl alcohol dissolved in 0.25 g of ODE was quickly injected into the above mixture at this temperature. Within about 2-5 minutes of addition of decyl alcohol, the reaction mixture became more turbid without any signs of precipitation. The reaction was monitored by FTIR and TEM by taking aliquots at different temperatures enroute to 250° C. and also at different time intervals at 250° C. The nanoflowers formed were about 30 nm in diameter. After the formation of nanoflowers, as indicated by TEM, the temperature was raised to 270° C. and incubated for about 3 hours to form faceted nanodots.

Small sized nanoflowers (about 15 nm in diameter) were formed by injection of decyl alcohol (0.06 mmol in 0.25 g ODE) into a mixture containing $In(Ac)_3$ (0.02 mmol), MA (0.06 mmol) and 4.75 g of ODE at about 250° C.

Similarly, large sized nanoflowers (about 60 nm in diameter) were synthesized by using SA in place of myristic acid (MA). In one example, a mixture of $In(Ac)_3$ (0.1 mmol), SA (0.3 mmol) and ODE (4.75 g) was heated to 290° C. and then decyl alcohol (0.3 mmol in 0.25 g ODE) was injected into the heated mixture.

Synthesis of Stable Dot-shaped $In_2O_3$ Nanocrystals: (a) Injection of precursors: Stable dot-shaped (about 4-8 nm) $In_2O_3$ nanocrystals were formed by direct injection of pure $In(Mt)_3$ or $In(St)_3$. In one embodiment, ODA (3 mmol) and ODE (4.5 g) were loaded in a 25 mL three-necked flask to form a mixture that was degassed and heated to 290° C. A solution of $In(Mt)_3$ or $In(St)_3$ (0.1 mmol) in 0.5 g of ODE was prepared separately by degassing and heating to 120° C., and then swiftly injected into the above mixture at 290° C. to form a reaction mixture. The reaction mixture was incubated for about 30 minutes. Aliquots were taken at different time intervals after injection of the precursor for monitoring size by TEM.

(b) Injection of Alcohol into Pure In(Mt)$_3$: large sized dot-shaped nanocrystals (about 15 nm in diameter) were synthesized by injecting decyl alcohol into a mixture of In(Mt)$_3$ and MA in ODE. In an exemplary experiment, decyl alcohol (0.5 mmol in 0.25 g of ODE) was injected into a mixture containing In(Mt)$_3$ (0.1 mmol) and MA (0.3 mmol) in ODE (4.75 g). The reaction was incubated for about 1 hour to yield dot-shaped nanocrystals of about 15 nm.

(c) Injection of Alcohol to In(Mt)$_3$ formed in situ by Reacting In(Ac)$_3$ and MA: Dot-shaped nanocrystals were also formed by the injection of decyl alcohol (0.5 mmol of DA dissolved in 0.25 g ODE) into a mixture containing In(Ac)$_3$ (0.1 mmol), MA (0.6 mmol) and 4.75 g of ODE at 290° C.

Purification of In$_2$O$_3$ Nanocrystals (Nanodots and Nanoflowers): In$_2$O$_3$ nanocrystals were synthesized through the same procedure as described above. The reaction mixture was cooled down to 30° C.; about 20 mL of ethyl acetate was used to precipitate indium oxide nanocrystals, and the nanocrystals were collected by centrifugation. The nanocrystals were then dispersed in toluene and any insoluble residue was removed by centrifugation. In$_2$O$_3$ nanocrystals were precipitated by acetone and collected by centrifugation.

Fourier Transform Infra-red Spectroscopy (FTIR): FTIR spectra were obtained on a Bruker Tensor 27 spectrophotometer. The specimens were prepared by directly spotting hot aliquots of a reaction mixture onto a NaCl crystal. This was done to obtain quantitatively reliable data for understanding the reaction. Dilution of the aliquots with solvents like CHCl$_3$ and hexane was avoided because the solubility of the starting materials, products and side products were quite different from each other at room temperature.

Transmission Electron Microscopy (TEM): TEM and high resolution TEM images were taken on a JEOL X-100 at 100 kV and Tecnai F30 field emission gun scanning transmission electron microscope equipped with an X-ray energy-dispersive spectroscopy (EDS) system. Point-to-point resolution of the HRTEM was about 0.19 nm. Samples for JEOL X-100 were prepared by dipping a formvar coated copper grid into a toluene solution containing the purified nanocrystals or into a hexane solution containing the aliquots taken during the course of a reaction. Selected area diffraction (SAED) was taken with a camera length of about 120 cm. Specimen for HRTEM was prepared by depositing a drop of toluene solution containing the nanocrystals onto holey carbon-coated Cu grids.

Results and Discussions

ODE was selected as a solvent because it is a liquid at room temperature but with a high boiling point, inert to oxide formation, not very toxic, and inexpensive (less expensive than toluene). Using a non-coordinating solvent, as demonstrated below, allowed one to realize 3D attachment by simply tuning the concentration of the ligands in the reaction solution. The reaction products and reaction patterns according to the present invention, however, are substantially different from that observed in traditional approaches for the synthesis of transition metal oxide and post-transition metal oxide nanocrystals [14, 40].

Carboxylate salts were chosen as the precursors and fatty acids on a need basis, were used as the ligands because of environmental and cost concerns. In(Ac)$_3$ is probably the most readily available indium compound for a non-aqueous phase system and hence was selected as a starting material. The initial results indicated that direct reaction of In(Ac)$_3$ under elevated temperatures was complex. Other types of indium carboxylate salts, such as In(St)$_3$ and In(Mt)$_3$ were also synthesized and used as precursors to practice the present invention. Results for fatty acid salts with different chain lengths were fairly the same and the results pertaining to In(Mt)$_3$ are given in detail along with the results for using In(Ac)$_3$.

Aliphatic alcohol with an adequate concentration was chosen as a mild activation reagent (in comparison to amine), to design a high yield and a controllable scheme for high quality oxide nanocrystals.

Formation of In$_2$O$_3$ nanocrystals under different reaction conditions was studied systematically by varying the concentration of the ligands, the concentration of the precursors, the chain length of the ligands, the manner of introduction of precursors into the reaction system, the reaction temperature and time, and temperature for the addition of alcohol, etc. Using MA as the ligands, six reaction schemes 110, 120, 130, 140, 150 and 160 according to embodiments of the present invention and TEM images (a)-(f) of the representative nanocrystals are summarized in FIG. 1.

Under the given conditions, In(Ac)$_3$ became soluble in ODE, only if fatty acids were added into the solution. The synthetic reactions in FIG. 1 were classified into two groups. The reactions 140, 150 and 160 shown in FIG. 1($d$)-1($e$) were all related to the direct heating of the dissolved In(Ac)$_3$, in the presence of MA as the ligands, to the desired reaction temperatures. FIG. 1($a$)-1($c$) showed the reactions 110, 120 and 130 in which In(Mt)$_3$ was isolated, purified, characterized and used as the precursor.

At first glance, the two groups of reactions, with or without the isolation of In(Mt)$_3$, seemed to be quite different from each other. However, there exists a general and interesting trend for both groups. When the concentration of ligands was low, the resulting nanocrystals were nanoflowers, single crystalline nanostructures with complex 3D morphology, for example, in FIGS. 1($b$), 1($d$) and 1($e$). When the concentration of myristic acid (MA) was doubled, the resulting nanocrystals in both cases switched from nanoflowers to dots. This can be easily seen by comparing two approaches shown in FIGS. 1($c$) and 1($f$). In order to understand this better, reactions under different conditions were closely monitored by FTIR, as shown in FIG. 2.

Figure 2:
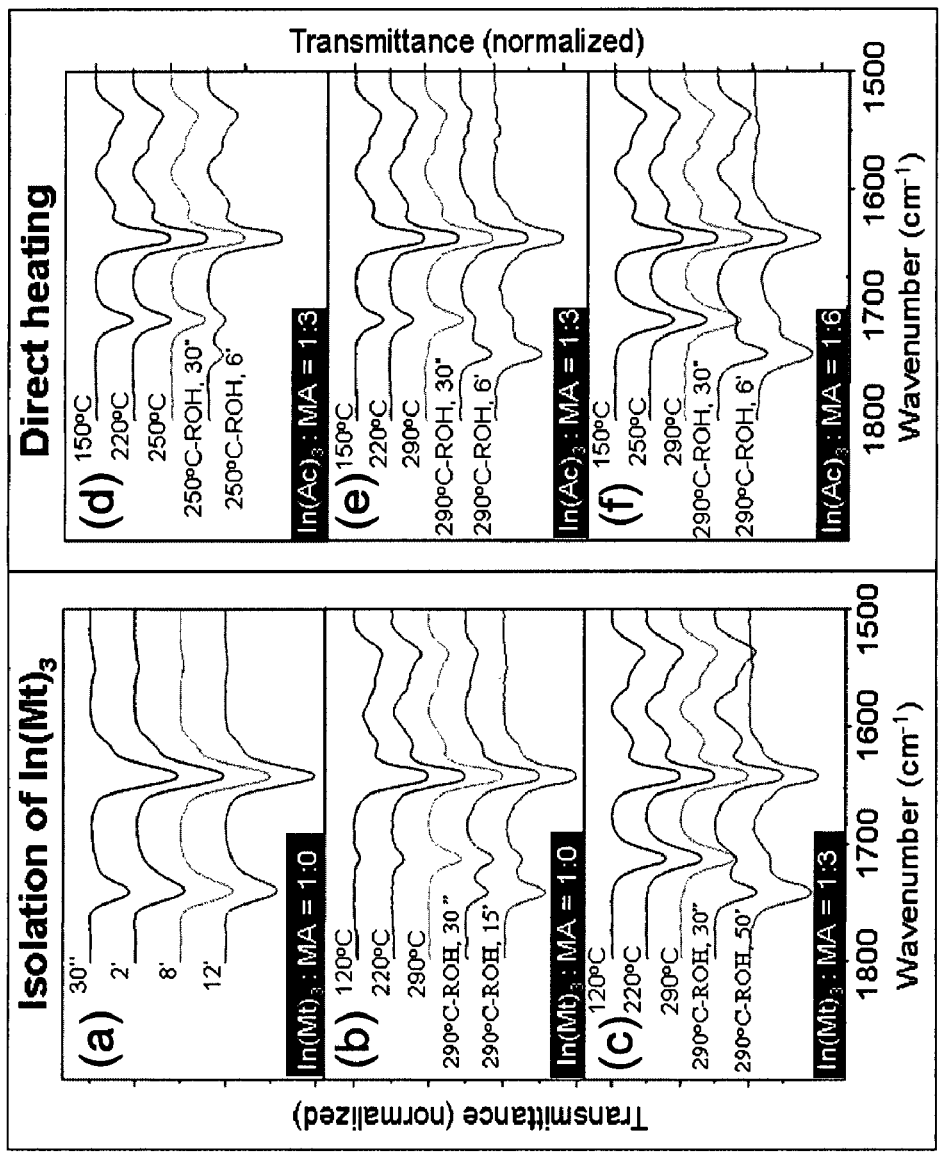
FIG. 2 shows the temporal evolution of FTIR spectra for the corresponding reaction schemes shown in FIG. 1.

The temporal evolution of FTIR spectrum for each corresponding reaction shown in FIG. 1 was shown in FIG. 2. The assignments of the main IR vibration bands in the spectral window shown in FIG. 2 were summarized in Table 1.

TABLE 1

| IR assignments | | |
|---|---|---|
| Frequency (cm$^{-1}$) | Nature of the vibration | Assignment methods |
| 1539 and the shoulders at 1565 and 1607 | COO$^-$ asymmetric stretch | From reference [41] |
| 1642 | C=C stretch | Assigned by comparing with the standard IR spectrum of ODE |
| 1711 | C=O stretch from COOH | Assigned by comparing with the standard IR spectrum of myristic acid in ODE |
| 1739 | C=O stretch from ester | From reference [41] |

Although most assignments in Table 1 were straightforward, the carbonyl peak of carboxylic acid group (COOH) at about 1711 cm$^{-1}$ was quite different from pure MA which is typically found at about 1702 cm$^{-1}$. This variation could be explained by different hydrogen bonding environments for the carboxylic groups in the non-polar reaction mixture and pure (solid) state [42]. To further confirm this, the side products of the related reactions, for example, the middle reaction shown in FIGS. 1(a)-1(c), were isolated. The FTIR, $^{13}$C NMR, and $^1$H NMR spectra of the purified compound were found to be identical to that of pure myristic acid. Furthermore, the carbonyl vibration frequency of myristic acid in ODE upon heating also showed a similar shift. With these evidences, the assignment for this major peak was listed in Table 1.

All the spectra shown in each plot for a specific reaction shown in FIG. 1 were normalized using the relatively intense C=C vibration band at 1642 cm$^{-1}$ originating from ODE (the solvent) as the standard, which should be a constant during the entire course of the reaction. To make the FTIR data quantitatively reliable, it was necessary to spot the hot aliquots directly onto an IR substrate. This was so because the solubility of the starting materials, products, and side products are substantially different from each other at room temperature although they all were found to be soluble in ODE under elevated temperatures. Thus, dilution of the aliquots by any tested solvents resulted in quantitatively unreliable FTIR data. For instance, when CHCl$_3$ was used as the dilution solvent, the COO$^-$ asymmetric vibration band was often falsely presented as the saturation concentration of the carboxylate salts in the solvent.

The replacement of acetate in In(Ac)$_3$ by myristate or other long chain carboxylates used in a specific reaction was expected to be completed above the boiling temperature of acetic acid. The FTIR data, however, indicated a quite different pattern. Upon heating to 140° C., insoluble In(Ac)$_3$ disappeared and the entire reaction system became a clear solution. FTIR data indicated that, even if the In:MA ratio was set as 1:3—just a sufficient amount of MA to replace all acetate—there was still significant amount of COOH detected in the IR spectra (the first spectrum in the reactions shown in FIGS. 2(d) and 2(e) after the precursor became soluble. This peak was fairly constant in intensity upon heating to approximately 180-200° C. and increased thereafter on further heating. Since the boiling point of acetic acid is about 120° C., this vibrational band came from the unconverted MA. If assuming each indium ion was coordinated with three carboxylate groups, the ratio of ligands between acetate and myristate was found to be around 1:2 as judged by the FTIR peak intensities. This indicated that the ligand replacement did not go to completion and the resulting soluble indium compound was a carboxylate salt with mixed ligands, roughly two myristate and one acetate per indium.

Reaction of the soluble indium carboxylate compounds was found to be strongly dependent on reaction conditions. When fatty acids, such as myristic acid, were in large excess, for example, the reaction shown in FIGS. 1(c) and 1(f), no observable changes were found by neither FTIR, see the plots shown in FIGS. 2(c) and 2(f), nor TEM (no particles being found) up to 290° C. in comparison to that after the solution became clear. Literature indicates that indium acetate, similar to other acetates [43] should decompose at 270° C. [44]. This observation thus had two implications. First, pyrolysis of the precursors was not occurring under the given conditions. Second, the soluble indium carboxylate compound for the direct heating case was chemically quite different from pure In(Ac)$_3$. This further indicated that one should be cautious to judge the reaction pathway when metal acetate salts were used as precursors, if other potential ligands existed.

When In(Ac)$_3$:MA ratio was 1:3, as shown in FIGS. 2(d) and 2(e), which was the theoretical amount of MA needed for replacement of all acetate, the carbonyl vibration of free acids increased when the temperature was higher than about 180-200° C. This increase was accompanied by a decrease in the peak intensity for the asymmetric vibration bands of carboxylate group. These changes became much more visible when purified In(Mt)$_3$ without the addition of any free MA was used, as shown in FIG. 2(b). The rate of this conversion increased as the reaction temperature increased. At a given temperature, the system reached a steady state with a fixed intensity ratio for the two vibrational bands, the one belonging to COOH and the other one corresponding to COO$^-$. The isolated compound giving the COOH vibrational band at 1711 cm$^{-1}$ was confirmed to be free MA.

The most plausible reaction which converted In(Mt)$_3$ to free MA was the hydrolysis of the salt. For hydrolysis to be significant for the given reaction system, only about 1 mg of water was needed theoretically. The purified In(Mt)$_3$ salts were found to possess visible IR features associated with water. Anhydrous In(Mt)$_3$ without hydrolyzing the compound was not found, in spite of vacuum drying the purified product over night. This implies that In(Mt)$_3$ contained some structured water. Nevertheless, one reaction was carried out, for which the reaction system was pumped/purged with argon three times at 100° C. using standard protocol prior to heating up to 290° C. The formation of free acid was indeed found to be significantly slowed down.

The IR spectra of the reaction mixture eventually reached a steady state within the temperature range, with or without excess ligands, if no alcohol was added. In other words, under any conditions, the system maintained a constant intensity for both COOH and carboxylate vibrations. This again indicated that the soluble indium carboxylate salts did not undergo spontaneous pyrolysis by themselves. As discussed below, the yielded free acid actually reacted with In$_2$O$_3$ nanocrystals, the reverse reaction of hydrolysis. Therefore, the observed steady state was the equilibrium state between hydrolysis of the indium salt and dissolution of the nanocrystals by the free acids.

The presence of alcohol changed the reaction path quite significantly. Formation of esters was evidenced by the rapid appearance of the strong carbonyl group for ester at about 1739 cm$^{-1}$ and the complete disappearance of the COOH and COO$^-$ vibrational bands within a few minutes at 290° C., for instance, the last IR spectrum in each series in FIG. 2 with the exception of the one in top plot in FIGS. 2(d)-2(f). At lower reaction temperatures, such as at 250° C., this process occurred at a slower pace, as shown in FIG. 2(d).

It is interesting to compare the reactivity of zinc and indium carboxylate salts. Zinc salts do not undergo hydrolysis under the same conditions and the dissolution of ZnO nanocrystals by free fatty acids was extremely fast [40]. This difference was the reason why formation of high quality ZnSe and ZnS nanocrystals [45] did not require any substantial degassing in comparison to the synthesis of InP and InAs nanocrystals [46]. For both cases, injection of anionic precursors was carried out after the metal fatty acid salts were heated to at least 250° C. At such temperatures, if a tiny amount of water existed, indium salts would partially undergo hydrolysis but zinc salts would be stable.

Figure 3:
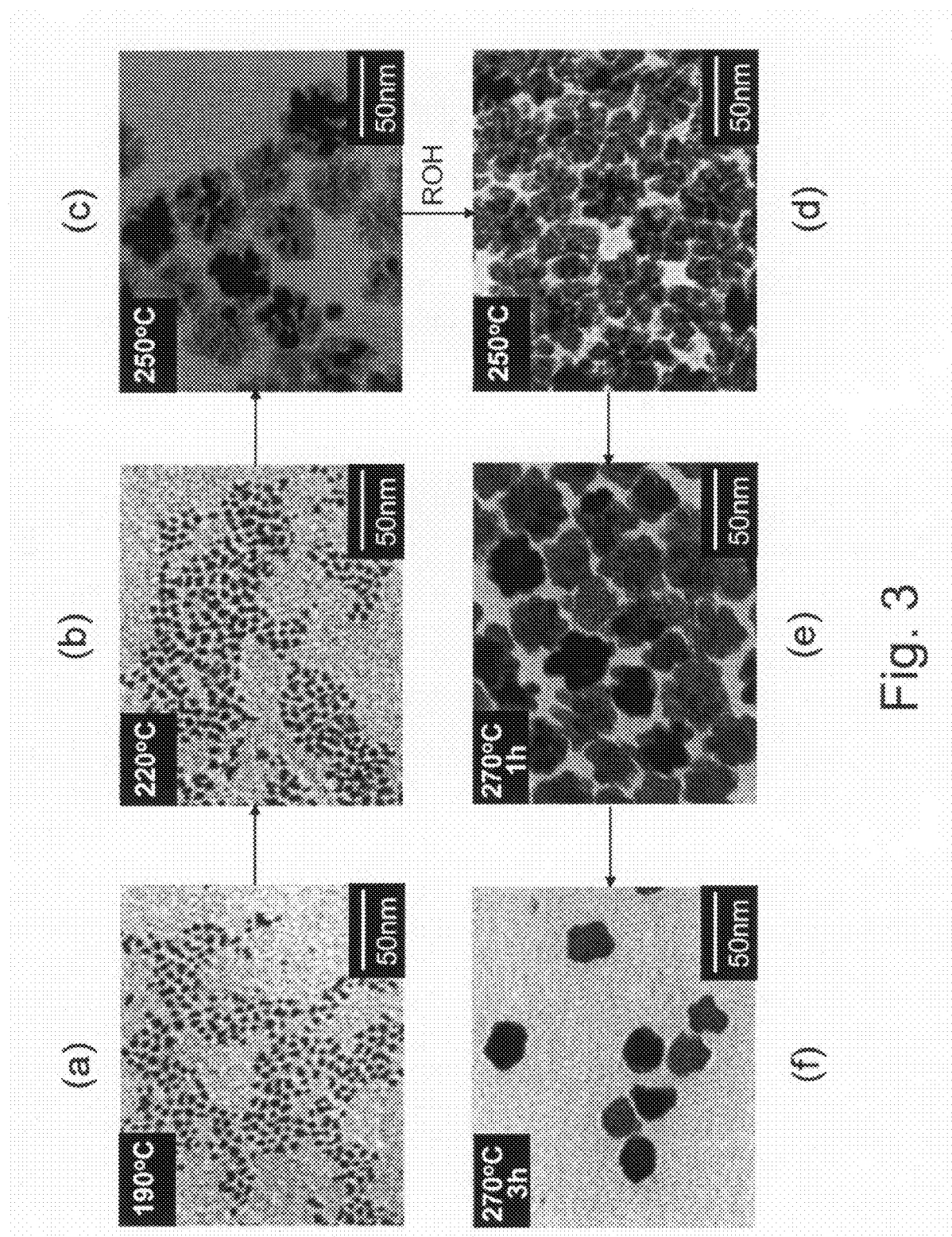
FIG. 3 shows the temporal evolution of the morphology of the nanocrystals for a reaction carried at 250° C., according to scheme (d) in FIG. 1.
Figure 4:
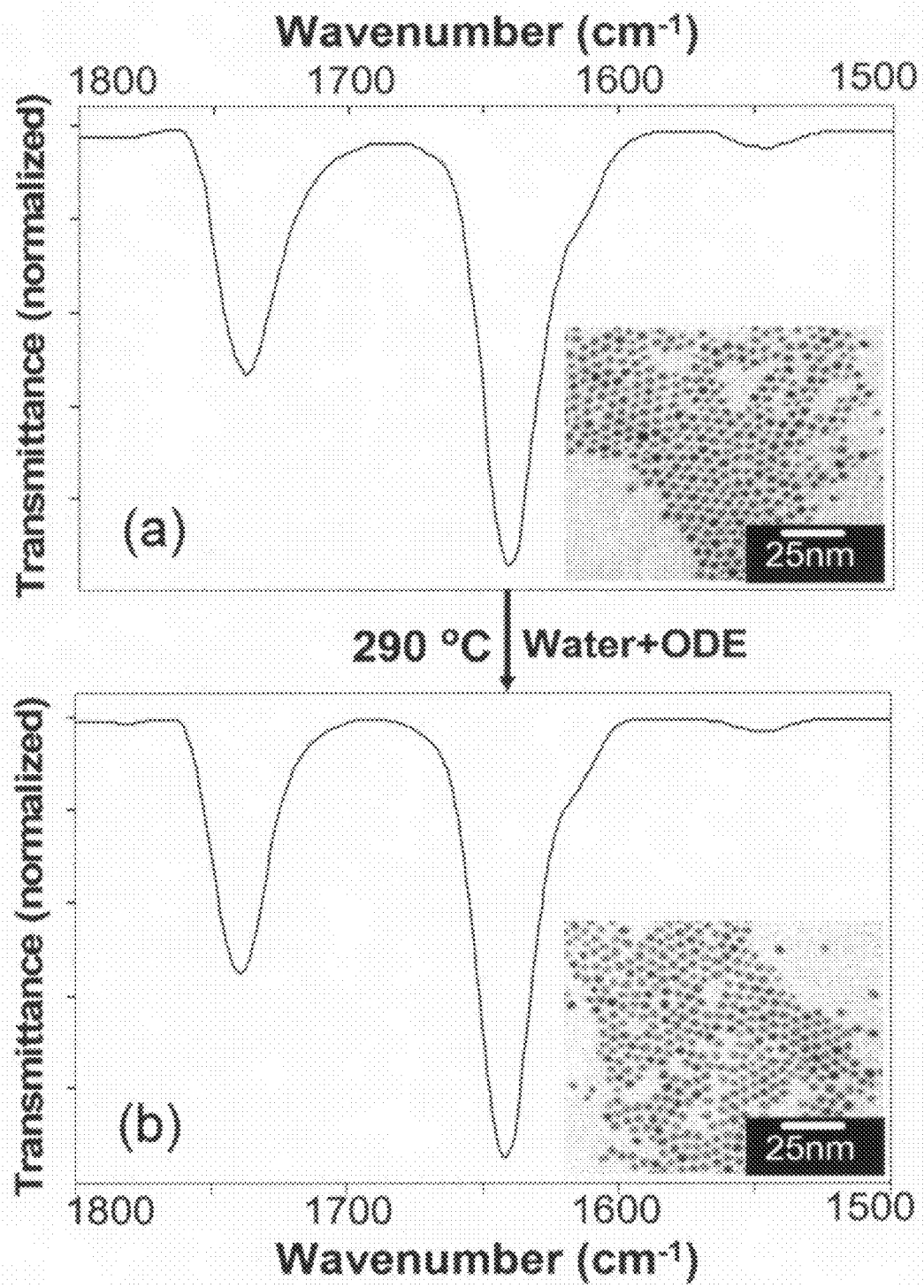
FIG. 4 shows FTIR spectra and TEM (inset) images of the nanocrystals before (a) and after (b) water addition according to one embodiment of the present invention.

Three-dimensional (3D) oriented attachment was evidenced by the temporal evolution of the morphology of the nanocrystals, as shown in FIG. 3, and also by their structural analysis. Appearance of dot-shaped nanocrystals was observed when hydrolysis just started in the temperature range of about 180-220° C. and the particles grew slightly in size as the reaction temperature was increased, as shown in FIGS. 3(a) and 3(b). At about 250° C., nanoflowers became the dominating species with the disappearance of the dots, as shown in FIG. 3(c). At the same time, the reaction mixture became slightly turbid but no precipitation occurred. If no heating or addition of alcohol was applied to the reaction system, the reaction remained stable without any visual change by either naked eye or TEM measurements. Addition of alcohol made the reaction mixture significantly more turbid and still no precipitation was evidenced. TEM measurements indicated that the concentration of the nanoflowers was much higher than that before alcohol injection, as shown in FIG. 3(d). Careful purification indicated that the turbidity was due to the light scattering caused by the nanoflowers, which were dispersible in non-polar solvents as a stable colloidal solution. When the reaction temperature was increased to 270° C., the nanoflowers became less pointing and more round, as shown in FIG. 3(e). Continued heating at this temperature finally turned the nanoflowers to faceted and single crystalline nanodots, as shown in FIG. 3(f).

Not all stages of morphology evolution shown in FIG. 3 were observed in a complete sequence. For instance, the final conversion from nanoflowers to faceted nanodots was not observed if the reaction temperature was set at 250° C. If free fatty acids were not stable, being consumed within a few minutes at 290° C. and in the presence of alcohol, the nanoflowers were very stable upon heating for at least seven hours. The latter fact indicated that the smoothing process and the transition of nanoflowers to nanodots involved the re-dissolution of the nanoflowers by the free fatty acids. In the case of ZnO nanocrystals, nanopyramids were dissolved to nanodots and zinc fatty acid salts by the addition of free fatty acids [40]. The resulting ZnO nanodots, however, grew back to the nanopyramids by the reaction between the alcohol and the salts. Accordingly, the resulting $In_2O_3$ nanodots were the stable species in this reaction and did not come back to nanoflowers under any conditions. In a typical 1D oriented attachment, the surface of the pearl-shaped nanowires/nanorods often became smoother upon heating in an irreversible manner, thereby resulting in nearly perfect nanowires/rods [47]. For 3D structures, similar smoothing process resulted in faceted nanodots.

The results suggested that the smoothing process of the nanostructures formed by oriented attachment requires their surface atoms to be "mobile or removable" in the reaction solution, which was consistent with the study for reversibility of ZnO nanocrystal growth [40]. Any intra-particle and Ostwald ripening required the components of a crystallization system to be significantly soluble as monomers in a solution. Otherwise, the system was permanently trapped in an arbitrary state, i.e., the nanoflowers for the current case.

Interestingly, even after exhausting the free ligands in the solution, the largely sized primary nanodots were unable to convert to nanoflowers. Prolonged heating in a large excess of alcohol might precipitate the nanodots, but no formation of nanoflowers was observed. Formation of nanoflowers always occurred in the early stages of a reaction with fresh and not so well developed nanodots. Furthermore, injection of indium precursors into hot alcohol-ODE solutions, as shown in FIG. 1(a), yielded nearly monodisperse nanodots, but these nanodots could not be converted to nanoflowers even if no excess ligands were present in the solution.

One may argue that this phenomenon, 3D oriented attachment always occurring in the early stage of a reaction, might be associated with the presence of a trace amount of water in the early stage of a reaction. After the reaction proceeded for a certain period of time, water would be mostly evaporated under such high temperatures, and thus the surface ligands became more stable because of lack of hydrolysis. Consequently, if the system did not enter into LLP in the early stage of the reaction, LLP and 3D oriented attachment would unlikely occur.

To test the hypothesis, a batch of stable nanodots at 290° C. was made, as shown in FIG. 4(a). After that, the nanocrystals were reacted with water by injecting a water-ODE mixture (5 mg of water in 1 g ODE). The reaction went violent for about two minutes because of the boiling of water, indicating a sufficient amount of reaction time for the nanodots with water. However, the nanocrystals did not seem to change at all as observed by either FTIR or TEM measurements, as shown in FIG. 4(b). This implies the above hypothesis was not correct.

Figure 5:
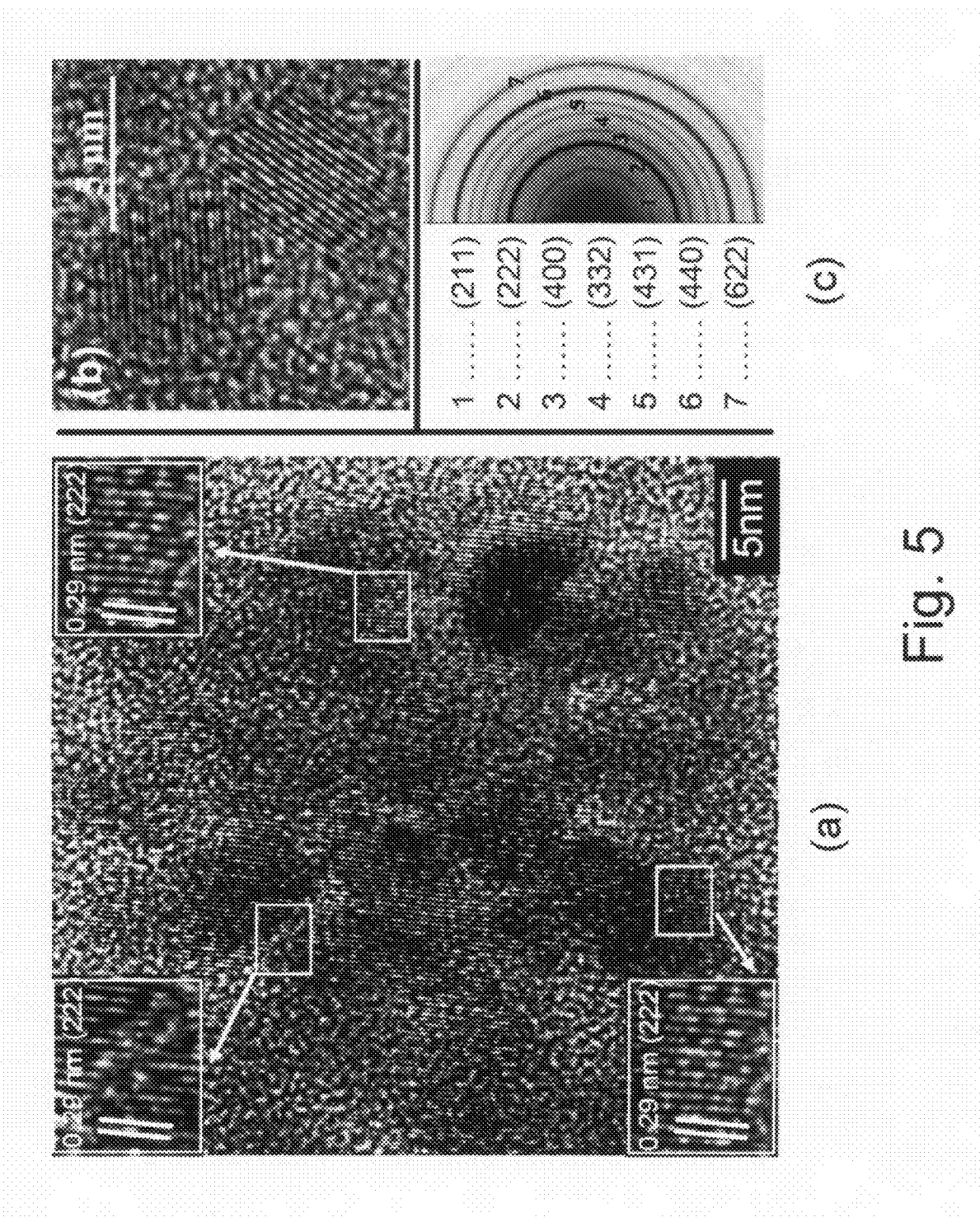
FIG. 5 shows HRTEM images of a representative nanoflower (a) and two nanodots (b), where both nanoflowers and nanodots show the same electron diffraction (c)

The single crystalline nature of the nanoflowers and nanodots was confirmed by HRTEM observations, as shown in FIG. 5. One typical HRTEM image of a nanoflower was shown in FIG. 5(a). The visible lattice fringes of all nanoflowers were found to run across the entire flower structure (insets in FIG. 5(a)), indicating oriented attachment of several particles to form the nanoflowers. Gaps between primary particles were visible (insets), but they did not interfere with the lattice orientation. As expected for random 3D attachment, there was no specific attachment axis identifiable by HRTEM. The nearly monodisperse nanodots were also single crystalline in nature. Both nanoflowers and nanodots were found to have the same diffraction pattern, which corresponded to the cubic phase of $In_2O_3$.

Figure 6:
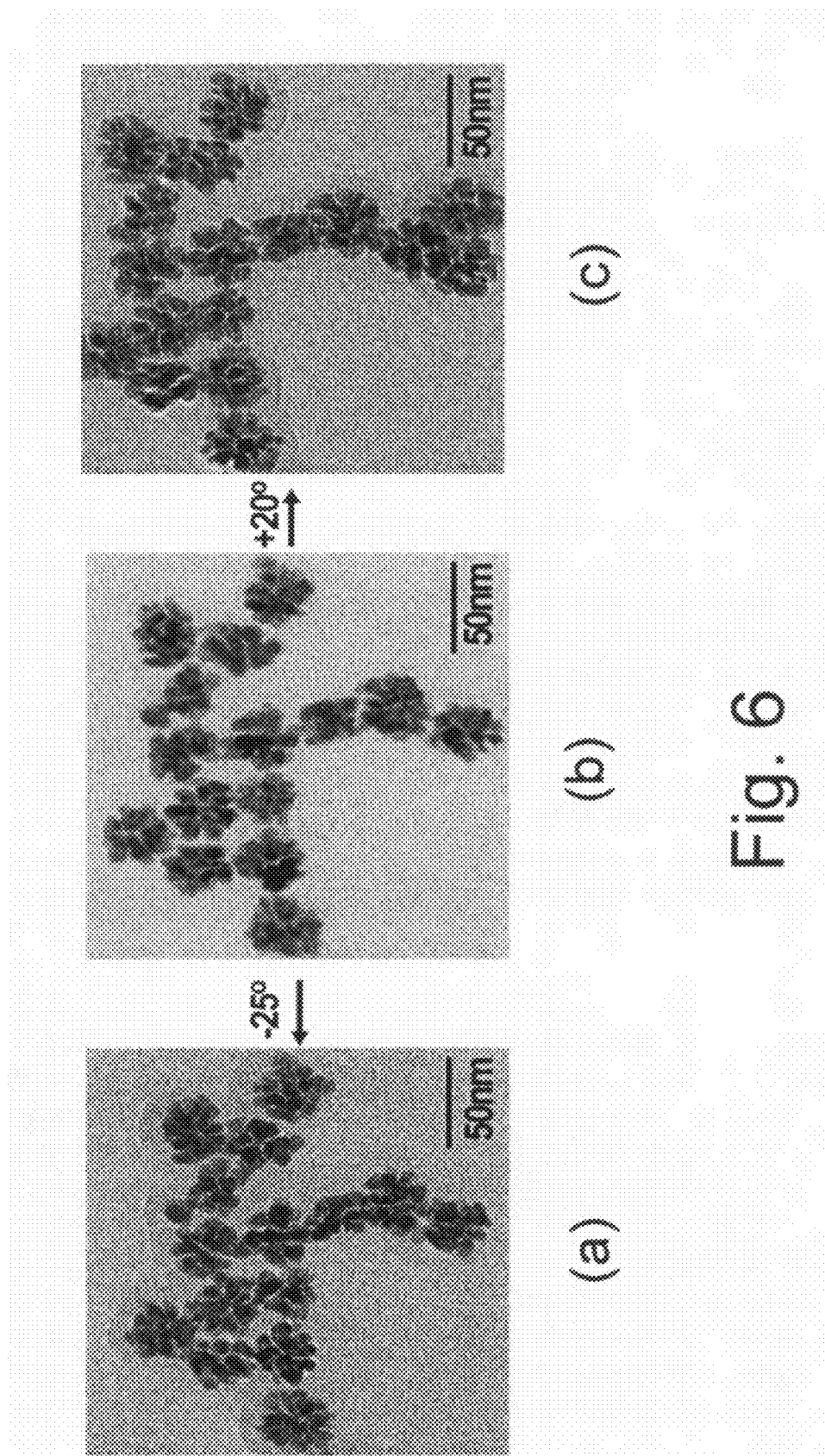
FIG. 6 shows TEM images (a)-(c) of a group of nanoflowers rotating at different angles.

The 3D nature of the nanoflowers was further confirmed by rotation experiments shown in FIG. 6. When the specimen was rotated in either way, as shown in FIGS. 6(a) and 6(c), the two dimensional projection of each nanoflower roughly remained the same, but the structural detail of each flower changed substantially. This indicated that the nanoflowers were true three-dimensional structures, instead of plates with their thickness different from their diameter. The rotation experiments and HRTEM observations further implied that each nanoflower was formed by geometrically random but lattice-oriented attachment of multiple primary nanocrystals.

Figure 7:
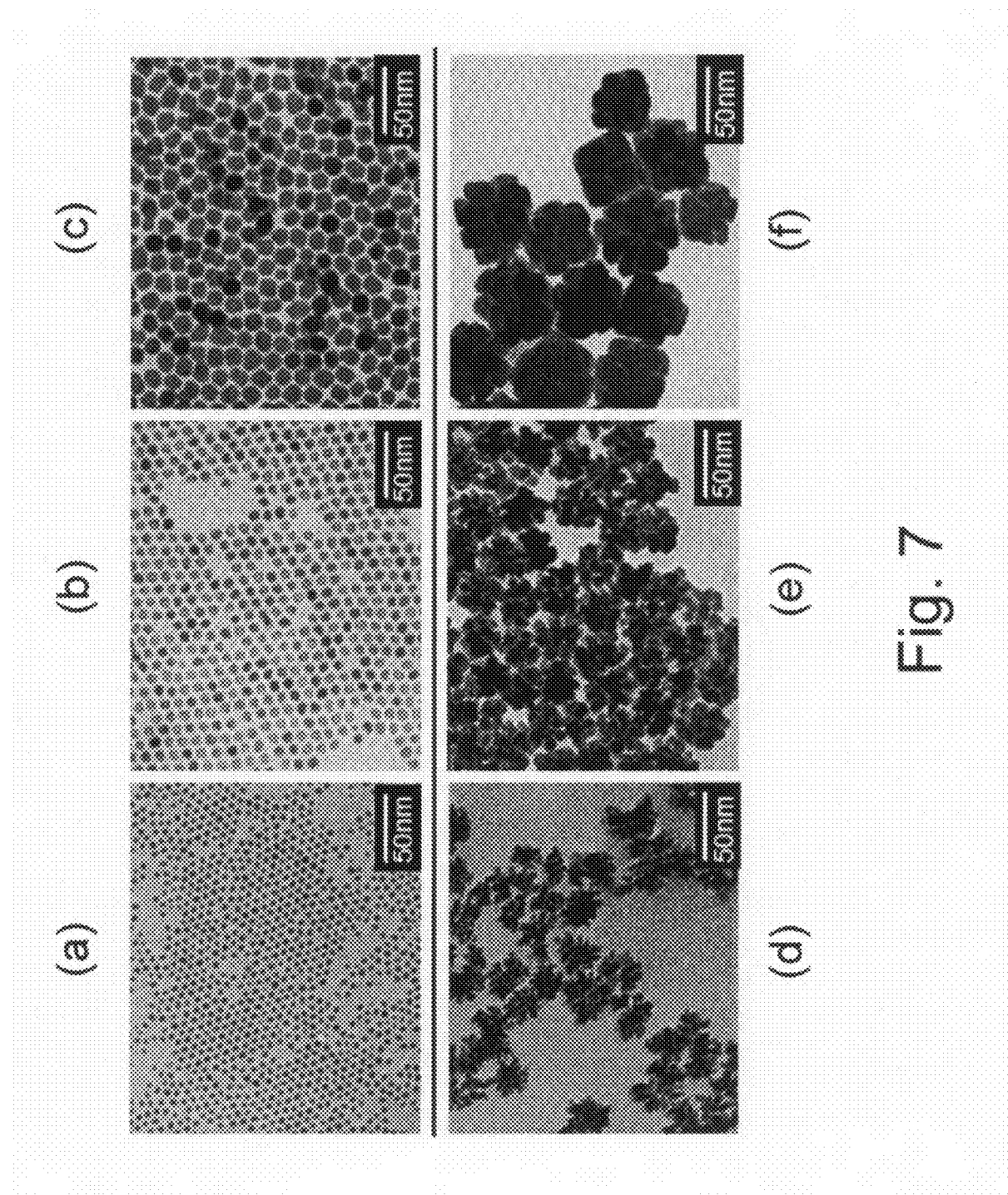
FIG. 7 shows TEM images of nanodots (a)-(c) and nanoflowers (d)-(f) with different sizes.

The size of both nanodots and nanoflowers, without multiple injections of precursors and size sorting, can be varied by changing the initial reaction conditions, as shown in FIG. 7. Nearly monodisperse nanodots were synthesized in the size range between about 4 and about 15 nm. Nanoflowers with a decent size distribution were formed in the size range between about 15 and about 60 nm. The yield of either nanodots or nanoflowers was close to unity, if esterification reaction was applied. The reactions generating nanodots as the sole products were the ones with excess fatty acid ligands no matter which reaction route, hydrolysis or esterification, the system went through. Typically, smaller nanodots were formed at shorter reaction times. A higher concentration of alcohol yielded smaller nanodots probably because the rapid esterification reaction generated more nuclei. A lower monomer concentration also gave smaller nanocrystals. Finally, injection of purified indium fatty acid salt precursors into alcohol at higher reaction temperatures, i.e., 290° C., yielded smaller dot-shaped nanocrystals. Injection of alcohol to a mixture of indium fatty acid salt precursor and the corresponding fatty acid resulted in the formation of large sized nanocrystals. Smaller nanoflowers were observed when a relatively low monomer concentration was used. Fatty acid ligands with a long hydrocarbon chain often yielded nanoflowers with large diameters. Nanoflowers formed in the early stages were more pointed, which became more round after prolonged heating, as shown in FIG. 3.

3D oriented attachment of nanocrystals with various compositions was examined. The experimental results of the $In_2O_3$ model system discussed above indicated that, under low ligand concentrations and/or with short ligands, 3D oriented attachment occurred. When nanocrystals were not sufficiently protected by organic ligands, aggregation was a reasonable pathway for minimizing the surface energy of nanocrystals [48]. This growth mechanism is called as "limited ligand protection" (LLP).

It should be pointed out that Kotov's group observed a similar phenomenon for 1D oriented attachment [7], where CdTe nanocrystals showed oriented attachment only after a purification process. The results according to the present invention, however, indicate that the oriented attachments without additional purification steps occur by controlling the degree of protection provided by the ligands to the nanocrystals.

Neither indium acetate nor other fatty acid salts of indium underwent pyrolysis as normally suggested. Instead, hydrolysis and esterification (with addition of alcohol) were identified as possible pathways. No amines were used as activation reagents mainly because of two reasons. It is environmentally appealing to have a synthetic system only containing C, H, and O in addition to the necessary targeted components of the nanocrystals, In and O in this case. In addition, amines were often found to be both activation reagents and ligands. Alcohol used in this system, however, did not bind to the surface of the nanocrystals as ligands, which makes it easier to understand the mechanism.

The main reactions observed in this given system can be summarized as follows.

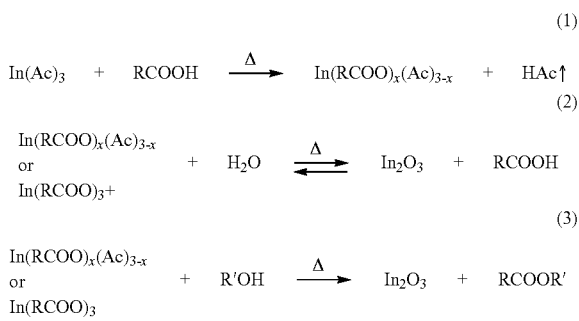

$In_2O_3$ represents the resulting nanocrystals irrespective of their shapes. The reversibility of reaction (2) was responsible for the formation of round flowers and their subsequent conversion into faceted dots. For the formation of nanoflowers, excess ligands should be avoided. This was so because excess ligands provide sufficient ligand protection for the yielded nanocrystals, which pushes the system to be out of the LLP mode.

Generally, nanoflowers were thermodynamically unstable species. If there were sufficient ligands in the system to make the monomers mobile, either on the surface or in the solution, nanoflowers would transform into dot-shaped nanocrystals, as shown in FIG. 3. When the monomers were reasonably stable in solution (mobile on the surface), the nanocrystals go through Ostwald (intra-particle) ripening. However, since reaction (3) was irreversible, free acids were consumed rapidly and completely if sufficient alcohol were present in the system. This was responsible for the stability of the nanoflowers in the high temperature synthesis (290° C.). On the contrary, complete conversion of the nanoflowers to faceted nanodots, as shown in FIG. 3, was observed at relatively lower temperatures. Consistent with this, the existence of free fatty acids for a long period of time, even after addition of alcohol, was shown in the top plot in FIG. 2(d).

Since reaction (3) was fast and also irreversible, addition of alcohol converted all free fatty acids and fatty acid salts into the corresponding esters. The free fatty acids underwent the reverse reaction in reaction (2) first and then followed reaction (3) to become esters. The irreversibility of reaction (3) also made the yield of the nanocrystals to be unity. This was similar to the ZnO nanocrystal system as disclosed in the next section.

Recent results on 1D oriented attachment strongly suggested that dipole moment of primary nanocrystals played a key role for the formation of 1D nanowires [6, 7, 10]. This hypothesis had been convincingly supported by the systematic and quantitative analysis for the case of PbSe nanowires [10]. The results according to the present invention, however, indicate that dipole moment may not be the only driving force for oriented attachment. In principle, if oriented attachment occurred in 3D randomly, the driving force must be more or less homogenous in three dimensions. Following the general expression of Gibbs's Law, the driving force for crystal growth is to minimize the total surface free energy of a system [48]. Certainly, oriented attachment would do so and the oriented feature should further limit the interface energy between primary particles.

Kotov's group revealed that removal of excess ligands in the system plays a key role in the formation of CdTe nanowires through 1D oriented attachment [7]. The results according to the present invention imply that a synthetic system may be directly controlled in oriented attachment regime by using a limited amount of ligands. If the primary nanocrystals are well surrounded by organic ligands, it would be difficult for the lattice of a nanocrystal to interact with others. Even if the ligands on the surface of nanocrystals are dynamically bound, primary nanocrystals would be more sterically isolated in a solution with more free ligands.

According to the present invention, an interesting phenomenon was observed; whereby nearly monodispersed nanocrystals formed either by injection or direct heating did not undergo oriented attachment even after there were no free ligands left in the system. A related fact mentioned in the results section was that formation of nanoflowers was always observed in the early stages of a reaction with not so well-developed primary dots. These facts indicate that nanocrystals with relatively high surface energy are more "suited" for oriented attachment.

As disclosed above, one may depict the 3D oriented attachment in a synthetic system as follows. When a system starts with an insufficient amount of ligands, below the critical ligand concentration for stabilization of individual nanocrystals at a given temperature, the freshly formed primary nanocrystals undergo 3D aggregation. The insufficient surface ligand coverage provides the needed kinetic driving force for 3D oriented attachment. Although dipole moment plays an additional role, probably sometimes also being a substantial role, in the kinetics of 1D oriented attachment, it is not as important as insufficient surface ligand coverage in the case of 3D oriented attachment. During the growth of nanocrystals, formation of 3D aggregates is always thermodynamically favorable because of the reduced surface free energy of the individual crystals. The excessively high surface energy of each not so well-developed primary nanocrystal forms the energetic driving force for the subsequent 3D oriented attachment. If the enthalpy gain from such oriented attachment dominates the entropy loss, 3D oriented attachment becomes thermodynamically favorable.

The key issue for designing a system which is capable of generating both monodisperse nanodots and 3D complex structures is to identify the critical ligand protection point.

This point is determined by the concentration and bulkiness of the ligands. Above the critical ligand protection point, monodisperse and stable nanodots can be yielded as the sole product. Below such a critical point, the freshly formed nanodots with high free surface energy rapidly become unstable after they are formed because of LLP. Subsequently, they aggregate to form 3D objects. The high surface free energy might further drive the primary nanocrystals to undergo oriented attachment to form the 3D aggregates, if the enthalpic gain dominates the entropic loss as discussed above.

In summary, the example according to the present invention, among other things, disclosed a synthetic system that was controllable to yield monodisperse nanocrystals with either dot-shape or flower-shape. For an $In_2O_3$ model system, 3D oriented attachment, yielded single crystalline flower-shaped nanocrystals. If the system provided sufficient ligand protection for the resulting nanocrystals, the resulting products were dot-shaped. Otherwise, LLP resulted in nanoflowers. For such a system, LLP occurred in both pathways, hydrolysis and alcoholysis. Systematic studies on reaction mechanisms, along with studies on traditional growth kinetics of nanocrystals, revealed that pyrolysis was not observed with the reaction temperature as high as 290° C. The results on other oxide systems, such as MnO and ZnO, are discussed below.

Example 2

Single Crystal Nanoflowers with Different Chemical Composition and Physical Properties Grown by LLP Experimental Procedures Materials: $In(Ac)_3$, MA, SA, selenium, tributyl-phosphine (TBP), decyl alcohol (DA) and 1-octadecene (ODE, tech 90%) were purchased from Aldrich. Zinc stearate $(Zn(St)_2)$, manganese chloride $(MnCl_2.4H_2O)$, cobalt chloride $(CoCl_2.4H_2O)$, tetramethyl ammonium hydroxide (TMAOH) and 1-Octadecyl alcohol (ODA) were purchased from Alfa Aesar. Octadecylamine (99.99%) was purchased from Fluka. All chemicals were used without further purification.

Synthesis of Indium Myristate $(In(Mt)_3)$: In an exemplary reaction, about 10 mmol of $In(Ac)_3$ was treated with about 40 mmol of MA and heated to 140° C. under an argon atmosphere to form a mixture. The mixture was heated for about 6 hours and then the resulting products were isolated by addition of acetone. The resulting precipitate was filtered, dried and again treated with MA (40 mmol) to ensure complete conversion of acetate to myristate. The final product $(In(Mt)_3)$ was washed several times with acetone to remove excess MA, dried and used as a precursor.

Synthesis of Cobalt Myristate $(Co(Mt)_2)$ and Manganese Stearate $(Mn(St)_2)$: $Co(Mt)_2$ and $Mn(St)_2$ were synthesized from their corresponding chlorides according to the literature method [14].

Individual nanocrystals (dots/pyramids) of $In_2O_3$, ZnO, CoO and MnO were obtained from the injection of corresponding long chain fatty acid salts into a mixture of 1-octadecylalcohol (ODA) and ODE at 290° C.

Synthesis of Dot-shaped ZnO Nanocrystals and Nanoflowers: In a reaction for the synthesis of ZnO nanocrystals, about 0.1 mmol of zinc stearate and 4 g of ODE were loaded in a 25 mL three-necked flask, degassed and heated to 280° C. under an argon atmosphere, to form a mixture thereof. About 0.5 mmol of ODA dissolved in 0.5 g of ODE at 150° C. was then injected into the above mixture and the temperature was brought down to 250° C. After incubating for about 10 min at 250° C., about 0.1 mmol of stearic acid dissolved in 0.5 g of ODE heated to 120° C. was injected into the reaction mixture. The resulting mixture was incubated for 1 hour to yield pyramid shaped ZnO nanocrystals.

$In_2O_3$, ZnO, CoO and MnO nanoflowers were formed from their corresponding acetates and myristic (MA) or stearic acid (SA). In an exemplary reaction for ZnO nanoflowers, a mixture of about 0.1 mmol of anhydrous zinc acetate $(Zn(Ac)_2$, 0.1 mmol of SA or MA and 4.75 g of ODE was heated to 280° C. under an argon atmosphere. About 0.75 mmol of decyl alcohol dissolved in 0.5 g of ODE was then injected to the above mixture to yield ZnO nanoflowers.

Synthesis of Dot-shaped $In_2O_3$ Nanocrystals and Nanoflowers: Stable dot-shaped (about 4-8 nm) $In_2O_3$ nanocrystals were formed by direct injection of pure $In(Mt)_3$ or $In(St)_3$ (0.1 mmol of $In(Mt)_3$ or $In(St)_3$ in 0.5 g of ODE at 120° C.) into a degassed solution containing about 3 mmol of octadecylalcohol (ODA) and 4.5 g of ODE heated to 290° C. The resulting mixture was incubated for about 30 minutes. Aliquots were taken at different time intervals after injection of the precursor for monitoring size by TEM.

In a reaction for the synthesis of $In_2O_3$ nanoflowers, a mixture of about 0.1 mmol of $In(Ac)_3$, about 0.3 mmol of MA and about 5 g of ODE was loaded in a 25 mL three-necked flask. The mixture was degassed and heated to 250° C. under an argon atmosphere. Decyl alcohol (0.3 mmol) dissolved in 0.25 g of ODE was quickly injected into the above mixture at this temperature. Within about 2-5 minutes of addition of decyl alcohol, the reaction mixture became turbid without any signs of precipitation. The nanoflowers formed were ~30 nm in diameter. Alternatively, nanoflowers of $In_2O_3$ can also be synthesized with indium myristate.

Synthesis of Pyramid-shaped CoO Nanocrystals and Nanoflowers: In one embodiment, 0.1 mmol of $Co(Mt)_2$ dissolved in 0.5 g of ODE at 150° C. was injected into a degassed mixture containing 0.5 mmol of ODA and 4.5 g of ODE at 290° C. The reaction was incubated for 30 minutes at 290° C. This resulted in the formation of pyramid-shaped CoO nanocrystals.

For the synthesis of CoO nanoflowers, a mixture of Co$(Ac)_2.4H_2O$ (0.1 mmol), MA or SA (0.2 mmol) and ODE (4.75 g) was loaded in a 25 mL three-necked flask, degassed and heated to 250° C. under an argon atmosphere, to form a mixture. At 250° C., decyl alcohol (1 mmol of DA dissolved in 0.25 g of ODE) was injected into the mixture, and the resulting mixture was incubated for 30 minutes.

Synthesis of Dot-shaped MnO Nanocrystals and Nanoflowers: MnO nanodots were formed by the injection of decyl alcohol (0.5 mmol of DA dissolved in 0.25 g of ODE) into a degassed solution containing $Mn(St)_2$ (0.1 mmol) and ODE (4.75 g) at 280° C.

Nanoflowers of MnO were formed when $Mn(Ac)_2.4H_2O$ was used as the precursor. In one reaction, a mixture of $Mn(Ac)_2.4H_2O$ (0.1 mmol), SA (0.2 mmol) and ODE (4.75 g) was degassed and heated to 250° C. in a 25 mL three-necked flask under an argon atmosphere. Decyl alcohol (1 mmol of DA dissolved in 0.25 g of ODE) was injected to the above mixture and the mixture was incubated for 20 minutes to allow the reaction to go to completion.

Synthesis of Dot-shaped ZnSe Nanocrystals and Nanoflowers: Dot shaped ZnSe nanocrystals were synthesized according to a modified literature method [45]. In one reaction, a mixture of 0.1 mmol of $Zn(St)_2$ and 4 g of ODE was loaded in a three necked flask, degassed and heated to 310° C. A separate solution of 0.08 g of octadecylamine (99.9%), 0.6 mL of TBPSe stock solution (0.9 gm Se in 8 gm TBP) was prepared and injected in the mixture at 310° C. Growth was carried out at 280° C. with further injection of 0.1 g of octadecylamine in 0.1 mL of ODE.

For ZnSe nanoflowers, the procedure was similar to the one for ZnSe dot shaped nanocrystals except with no addition of amine during the growth stage. The reaction was directly cooled to 220° C. and 0.1 mmol of $Zn(St)_2$ in 2 mL of ODE is injected in two phases. The reaction temperature is then increased to 260° C. and kept for 3 hrs to get ZnSe nanoflowers.

Transmission Electron Microscopy (TEM): TEM and high resolution TEM images were taken on a JEOL X-100 at 100 kV and Tecnai F30 field emission gun scanning transmission electron microscope equipped with an X-ray energy-dispersive spectroscopy (EDS) system. Point-to-point resolution of the HRTEM is about 0.19 nm. Samples for JEOL X-100 were prepared by dipping a coated copper grid into a toluene solution containing the purified nanocrystals or into a hexane solution containing the aliquots taken during the course of a reaction. Selected area diffraction (SAED) was taken with a camera length of 120 cm. Specimen for HRTEM was prepared by depositing a drop of toluene solution containing the nanocrystals onto holey carbon-coated Cu grids.

Results and Discussions

Metal carboxylates were used as the precursors and the solvent was generic hydrocarbon compounds, such as ODE. Alcohol was added to either activate the stable precursors or to increase the yield and stability [25] of the oxide nanoflowers. Amines were used as the activation reagents and ligands for the ZnSe nanoflowers while Se powder dissolved in tributylphosphine was used as the Se precursor. The results for a model system, $In_2O_3$ nanocrystals, were briefly summarized in FIG. 8 according to embodiments of the present invention.

Figure 8:
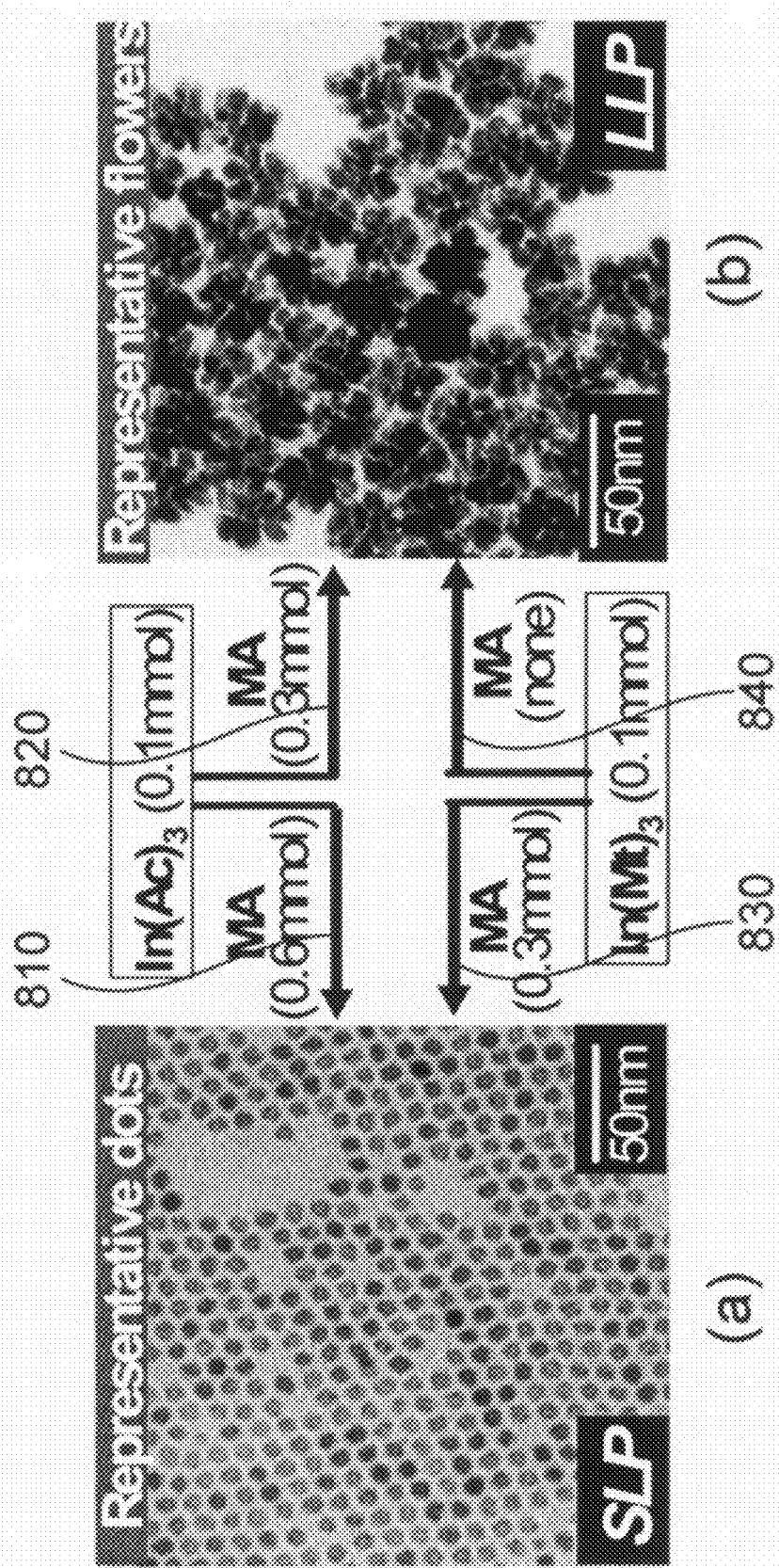
FIG. 8 shows schematic formation of $In_2O_3$ nanoflowers a limited ligand protection (LLP) domain and nanodots in a regular sufficient ligand protection (SLP) domain and their TEM images (a) and (b), respectively.

When $In(Ac)_3$ was used as the precursor, the extremely short ligands (acetate) on the precursor required a high ligand concentration for the stability of dot-shaped nanocrystals (reaction 810 shown in FIG. 8). As a result, if only one equivalent of long chain fatty acid, for example, MA, as opposed to two equivalents, was present, the system was found to be in the LLP domain. The individual dots became unstable and aggregated to form 3D nanoflowers (reaction 820 shown in FIG. 8). LLP could also be accomplished with fatty acid salts with a long hydrocarbon chain, such as $In(Mt)_3$, if no free myristic acid was added into the reaction (reaction 840 shown in FIG. 8). In comparison, addition of fatty acids yielded nearly monodisperse nanodots (reaction 830 shown in FIG. 8). All four reactions in FIG. 8 were carried out under the same conditions, except the type/concentration of precursors and ligands.

Figure 9:
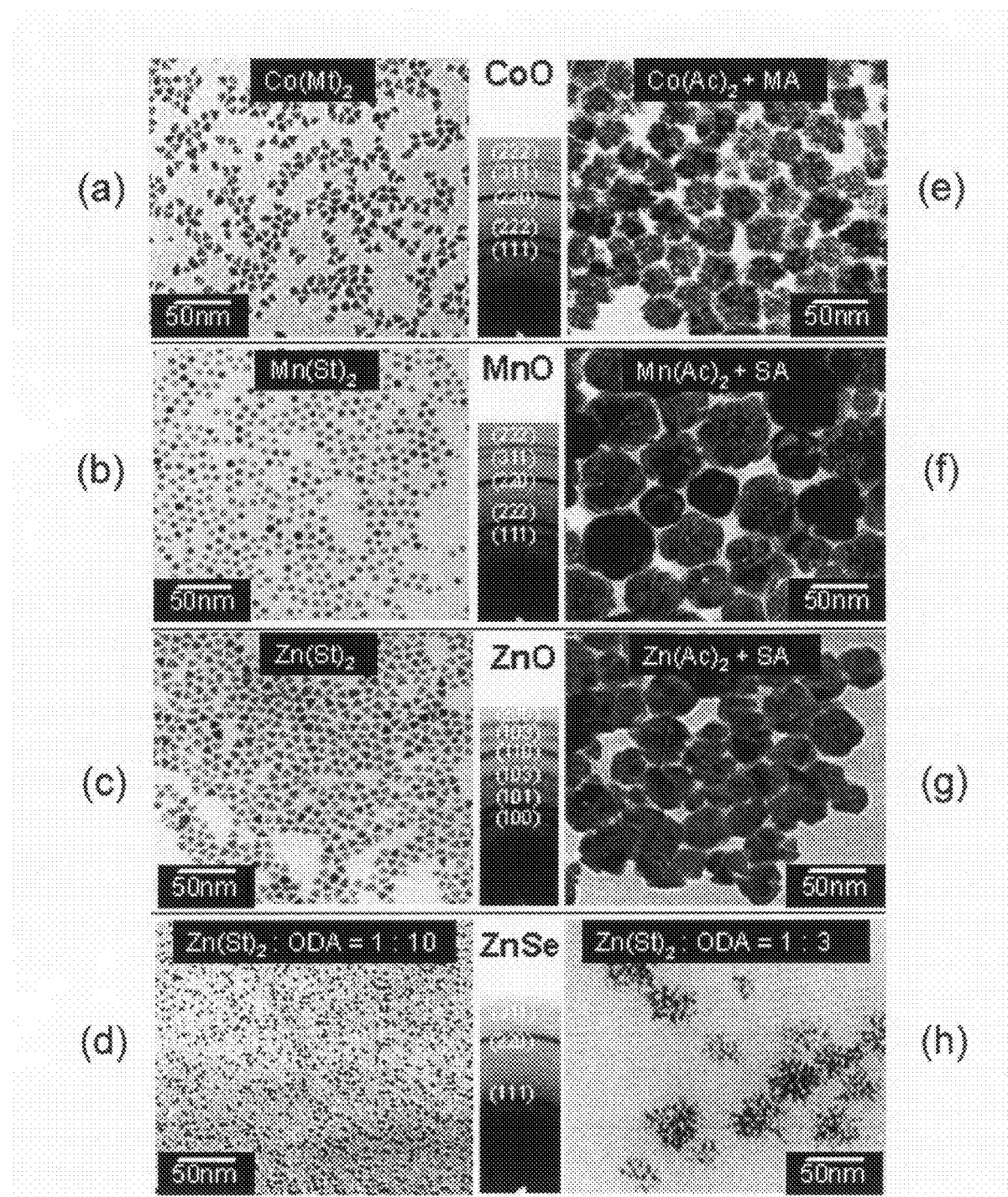
FIG. 9 shows TEM images of nanodots (a)-(d) and nanoflowers (e)-(h) according to different embodiments of the present invention, where the selected area electron diffraction pattern (SAED) is shown in the middle for a given embodiment.

FIG. 9 illustrates that a variety of reaction systems (a)-(h) can be tuned in either the regular sufficient ligand protection domain or LLP domain. This was achieved by the same means as discussed above, by using metal acetates as precursors and/or with a low ligand concentration. The results in FIGS. 8 and 9 reveal that these invented approaches allow the growth of both nearly monodispersed nanodots and nanoflowers without any size sorting.

Figure 10:
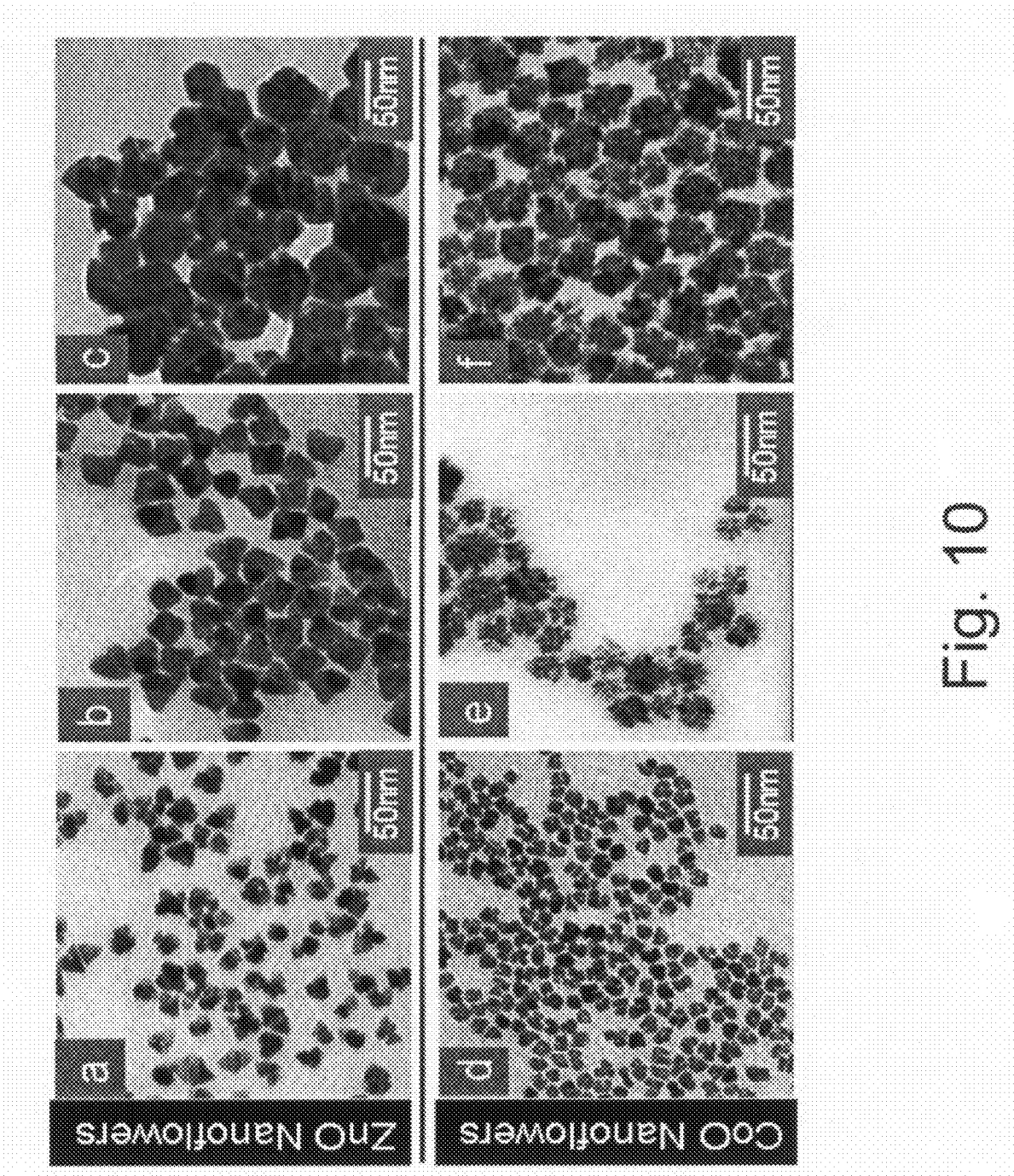
FIG. 10 shows TEM images of ZnO and CoO nanoflowers with different sizes and shapes according to embodiments of the present invention.

FIG. 10 shows TEM images of ZnO and CoO nanoflowers with different sizes and shapes. It was shown that TEM micrographs of ZnO nanoflowers grown with (a) 1:4 molar ratio of $Zn(Ac)_2$ to myristic acid (MA), (b) 1:4 molar ratio of $Zn(Ac)_2$ to stearic acid (SA) and (c) 1:1 molar ratio of $Zn(Ac)_2$ to MA, and TEM images of nanoflowers of CoO grown with (d) 1:2 molar ratio of cobalt acetate hydrate ($Co(Ac)_2.4H_2O$) to MA, (e) 1:2 molar ratio of $Co(Ac)_2.4H_2O$ to stearic acid (SA) and 5 minutes after addition of decyl alcohol (DA), (f) same as (e) but 20 minutes after addition of DA.

The 3D nanostructures were varied in size and shape in several different ways. The number of primary particles in each 3D ZnO aggregate was about the same in FIG. 10(a) (with myristic acid as the main ligands) and FIG. 10(b) (with stearic acid as the main ligands), but the size of the primary particles was different from each other. By using less free fatty acids, the number of primary particles in each nanoflower increased dramatically by decreasing the relative concentration of the fatty acid ligands, from FIG. 10(a) ($Zn(Ac)_2$:MA=1:4) to FIG. 10(c) ($Zn(Ac)_2$:MA=1:1). The primary particles in CoO nanoflowers formed in the early stages, (FIG. 10(e), 5 minutes of reaction) were less regular in shape and more pointing than those found in the later stage of the same reaction (FIG. 10(f), 20 minutes of reaction).

The nanoflowers shown above differ from each other in many ways. The five crystals belong to four different crystal structures, wurtzite (hexagonal) for ZnO, zinc blende (cubic) for ZnSe, rock salt (cubic) for CoO and MnO, and bixbyite $Mn_2O_3$ (I) type (cubic) for $In_2O_3$. Among these crystal structures, ZnO nanocrystals with wurtzite structure are known to possess a unique axis, c-axis, which is the direction of the electric dipole moment. CoO and MnO nanocrystals possess a magnetic dipole. The $In_2O_3$ system differs from other systems in the stoichiometric ratio between the cationic and anionic components in the crystal. Even for the ones with the same cationic and anionic ratio (1:1), the coordination number differ from case to case, being six in MnO and CoO and four in ZnO and ZnSe. ZnO and ZnSe are well known oxide and chalcogenide semiconductors, respectively.

Figure 11:
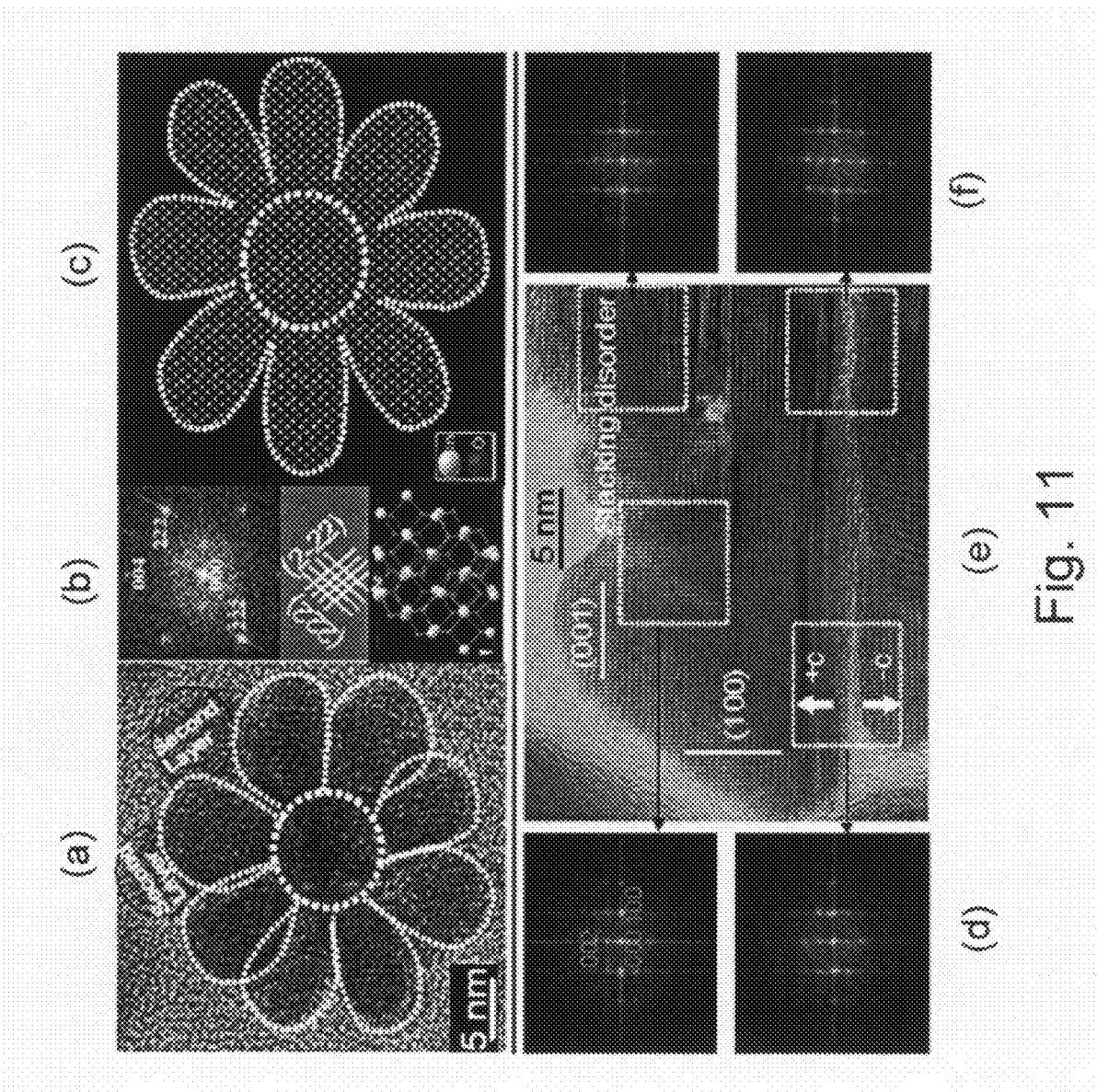
FIG. 11 shows (a) an HRTEM image of an $In_2O_3$ nanoflower with an outline (dotted line) for primary nanocrystals, (b) an FFT pattern of the selected area, lattice plane orientations in the HRTEM and unit cell structure of the cubic phase of the $In_2O_3$ nanoflower, (c) a schematic representation of a nanoflower, (e) an HRTEM image of a part of a ZnO nanoflower, and (a) and (f) FFT patterns of selected areas (dotted squares) in the HRTEM image.

Although LLP occurred in a variety of systems as shown in FIGS. 8-10, there were noticeable differences among resulting nanoflowers. The primary nanocrystals in $In_2O_3$ and ZnSe nanoflowers did not seem to be faceted. MnO nanoflowers were formed by faceted primary particles, but each primary nanocrystal did not seem to have a fixed morphology. ZnO nanoflowers were formed with nanopyramids as the primary particles, as shown in FIG. 11. The primary nanocrystals in CoO nanoflowers appeared to be cubic in shape. Evidently, shapes of the primary nanocrystals constituting a nanoflower were not necessarily the same as that of the corresponding individual nanocrystals grown under sufficient ligand protection, comparing TEM images shown in FIG. 9.

The nature of oriented attachment of primary nanocrystals to yield nanoflowers was evaluated by HRTEM. Oriented attachment [16] refers to the formation of relatively large single crystalline structures by the attachment of primary crystalline particles, typically dot-shaped nanocrystals. 1D oriented attachment of nanodots to form nanorods/nanowires has been well documented in the literature [6, 7, 9]. There are some strong evidences showing that electric dipole moment was the major driving force for 1D oriented attachment [6, 7, 9]. Similarly, it has been reported that ferromagnetic nanodots can be self-assembled into 1D nanowires by the magnetic dipole-dipole interactions between the primary particles in solution [49].

HRTEM results of ZnO nanocrystals are particularly interesting. For comparison, a brief analysis for the $In_2O_3$ nanoflowers is given as follows. The unit cell structure of $In_2O_3$ nanocrystals is shown in the middle panel of FIG. 11(b). The single crystalline nature of a nanoflower was confirmed by HRTEM (FIG. 11(a)) and the related FFT image (the top panel of FIG. 11(b)). The lattice fringes in each flower run across the entire structure although gaps between different primary nanocrystals were clearly observed (FIG. 11(a)). The attachment does not have a preferred direction as shown by the HRTEM image, as shown in FIG. 11(a) and the two-dimensional (2D) schematic reconstruction as shown in FIG.

11(c). Although the schematic representation of the nanoflower is shown in 2D (FIG. 11(c)), the 3D nature of the nanoflowers was evidenced by the contrast of the nanoflowers, as shown in FIGS. 8 and 11).

The 3D oriented attachment in ZnO nanoflowers was slightly different from that for the $In_2O_3$ system discussed above. The primary particles were faceted and mostly had a pyramid-shape, as shown in FIG. 11(e). Stacking faults that may result in a locally zinc blend-like domain also occurred in some nano-pyramids. More importantly, imperfection of 3D oriented attachment [16] could be seen in this example. Most ZnO nanocrystals attached to form a flower by keeping the same orientation, but a small misalignment was observed between some nanocrystals, such as the 1.5 degree mismatch between (100) lattice fringes in the left and right nanocrystals (FIGS. 11(d)-11(f)). The ZnO nanocrystals were found to attach together by sharing several different faces, including sharing their $(00\bar{1})$ faces, for example, the interface shown in FIG. 11(e). Such a kind of attachment cannot be caused by the electric dipole mechanism. As discussed below, one would expect the attachment of the $(00\bar{1})$ face of one primary nanocrystal to the (001) face of the other to form 1D ZnO nanowires, if the electric dipole was playing a determining role.

Different from $In_2O_3$ and ZnO does have a unique axis for the dipole moment, which is the c-axis of the wurtzite structure. It was shown by Weller's group [6] that ZnO nanorods could be formed by the 1D oriented attachment of spherical nanodots along their c-axis in an alcoholic solution. However, the results according to the present invention, shown in FIG. 11 indicate that, although ZnO nanocrystals have a dipole moment along the c-axis, 3D oriented attachment can still occur, instead of 1D oriented attachment. Comparing the experimental conditions between Weller's work and this example, one can notice that short ligands (acetate as the sole ligands) and significantly lower temperature (60° C.) were used in Weller's work. Very short ligands would greatly decrease the distance between primary particles and thereby enhance the dipole interaction between them. Low reaction temperature should reduce the thermal energy of the primary particles and allow them to align their dipole moments during the attachment events. It is appealing if one can purposely attach primary particles in either 1D, 2D, or 3D in a controllable fashion. Such insight in a given system may also help one to understand the natural mineralization processes occurring under high temperature and high pressure conditions, which should prefer 3D attachment, either perfectly or imperfectly, according to the discussions provided above.

Similar to electric dipole, magnetic dipole cannot play a determining role for 3D oriented attachment for magnetic CoO and MnO nanocrystals. Furthermore, both CoO and MnO nanoflowers were single crystalline in nature but MnO nanoflowers showed some sign of imperfect oriented attachment.

Although LLP makes individual nanodots unstable, the resulting nanoflowers were generally stable in the reaction solution and also dispersible in non-polar solvents after purification. The distinguishable stability of the nanoflowers is probably a result of its complex surface structure. The ligands bound to the surface atoms in the gaps of incompletely fused primary nanocrystals in a nanoflower should be kinetically "trapped" and hence difficult to be removed. Similarly, tetrapods and highly branched CdSe and CdTe nanocrystals [12, 22] were found to be more durable/dispersible in comparison to the corresponding nanorods.

Briefly, the present invention, among other things, discloses methods of synthesizing single crystalline and nearly monodisperse nanocrystals. A unique and general growth domain, LLP, is identified for the growth of nearly monodisperse 3D nanostructures through 3D oriented attachment. In LLP domain, primary nanocrystals are insufficiently protected but the resulting 3D nanostructures are stabilized. LLP is applicable for a broad spectrum of colloidal nanocrystals without drastically varying the synthetic chemistry for 0D and 1D nanocrystals established in the recent years. These single crystalline and complex nanostructures offer the field unique nanoarchitectures for developing high performance electronic, optoelectronic, and sensing devices.

Example 3

Synthesis of Branched D-Dots

Figure 12:
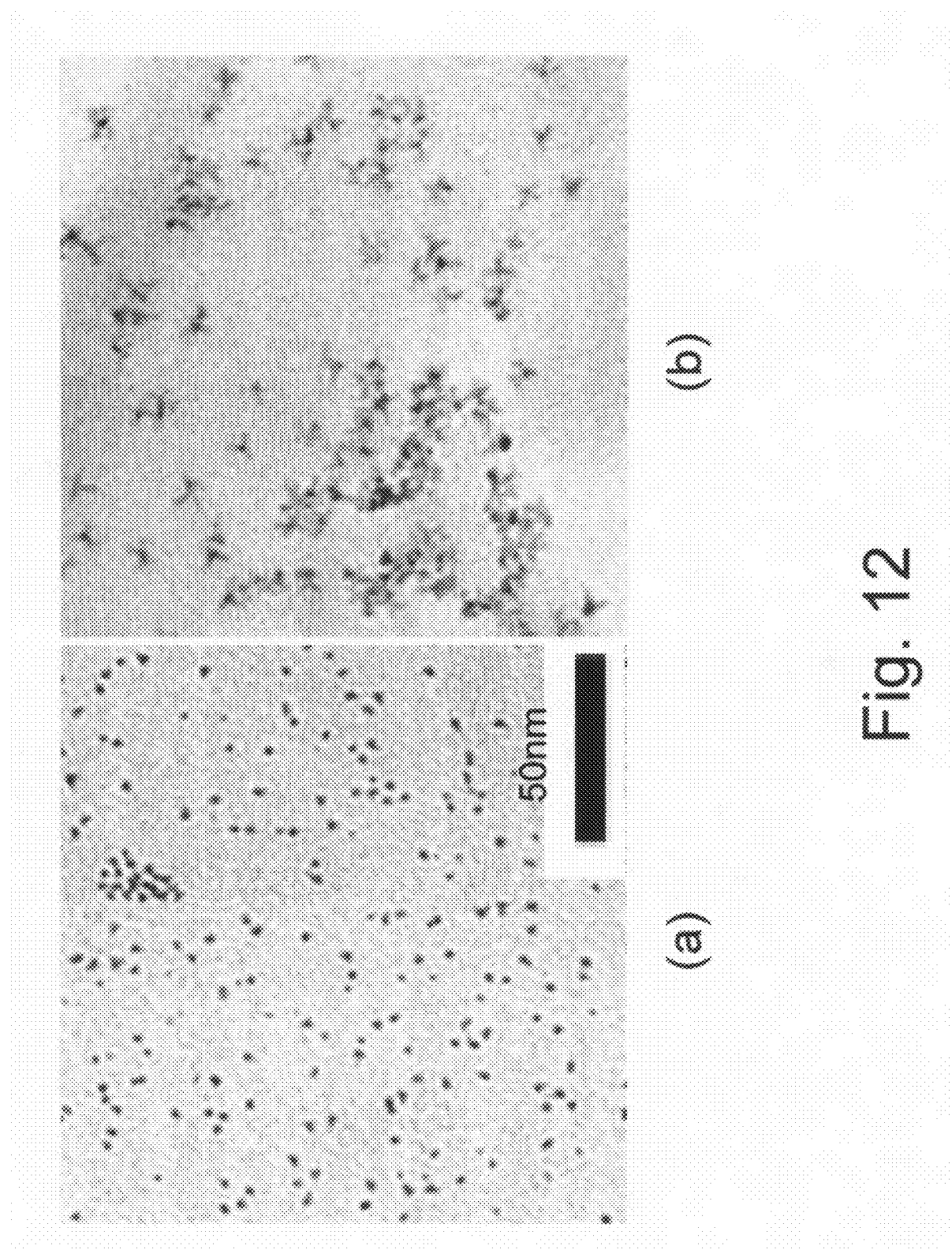
FIG. 12 shows two TEM images (a) and (b) branched nanocrystals with a doped center, where the composition is Mn doped ZnSe at the center and the branches are ZnSe crystals.

About 4.5 mL ODE and about 0.02 g of $MnSt_2$ were loaded into a 100 mL three neck flask and degassed at about 100° C. for about 20 minutes by bubbling with argon. The temperature was then raised to about 280° C. In a separate vial, about 0.2 g of ODA and 0.2 mL of TBPSe stock solution were mixed and heated to about 70° C., and injected into the above reaction flask at about 280° C. After the injection, the color of the solution rapidly turned faint yellow, which indicated formation of MnSe nanoclusters. The reaction was cooled to about 260° C. and annealed for about 20 minutes. The reaction temperature was then increased to about 290° C. and about 1 mL of the zinc precursor solution, prepared by dissolving about 0.36 g of zinc stearate and about 0.16 g of stearic acid into about 2.4 g of ODE was injected into the reaction flask. Immediately after the injection, about 0.2 mL of amine solution, prepared by adding about 0.5 g of ODA in about 0.5 g of ODE was injected into the reaction mixture. The reaction was cooled to 275° C. for about 10 minutes and then about 1 mL of zinc solution as well as about 0.2 mL of amine solution was injected. The reaction was further cooled to about 270° C. for about 10 minutes and the remaining zinc precursor solution was injected. The reaction mixture was heated for about 10 minutes and then allowed to cool and precipitated from acetone and redissolved in toluene which gave rise to branched structures, as shown in FIG. 12. Modifying the acid and the amine concentration in the reaction mixture allows one to modify the shape of the nanocrystal.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

LIST OF REFERENCES

[1]. Murray, C. B., Norris, D. J., Bawendi, M. G., Journal of the American Chemical Society 1993, 115, 8706-15.

[2]. Peng, X., Wickham, J., Alivisatos, A. P., Journal of the American Chemical Society 1998, 120, 5343-5344.

[3]. O'Brien, S., Brus, L., Murray, C. B., Journal of the American Chemical Society 2001, 123, 12085-12086.
[4]. Trentler, T. J., Hickman, K. M., Goel, S. C., Viano, A. M., Gibbons, P. C., Buhro, W. E., Science (Washington, D.C.) 1995, 270, 1791-94.
[5]. Peng, X., Manna, U., Yang, W., Wickham, J., Scher, E., Kadavanich, A., Allvisatos, A. P., Nature (London) 2000, 404, 59-61.
[6]. Pacholski, C., Kornowski, A., Weller, H., Angewandte Chemie, International Edition 2002, 41, 1188-1191.
[7]. Tang, Z., Kotov, N. A., Giersig, M., Science (Washington, D.C., United States) 2002, 297, 237-240.
[8]. Peng, Z. A., Peng, X., Journal of the American Chemical Society 2002, 124, 3343-3353.
[9]. Lee, S.-M., Cho, S.-N., Cheon, J. Advanced Materials (Weinheim, Germany) 2003, 15, 441-444.
[10]. Cho, K.-S., Talapin, D. V., Gaschler, W., Murray, C. B., Journal of the American Chemical Society 2005, 127, 7140-7147.
[11]. Cho, K., Koh, H., Park, J., Oh, S. J., Kim, H.-D., Han, M., Park, J. H., Chen, C. T., Kim, Y. D., Kim, J. S., Jonker, B. T. Physical Review B: Condensed Matter and Materials Physics 2001, 63, 155203/1-155203/7.
[12]. Peng, Z. A., Peng, X., Journal of the American Chemical Society 2001, 123, 183-184.
[13]. Sun, S., Zeng, H., Journal of the American Chemical Society 2002, 124, 8204-8205.
[14]. Jana, N. R., Chen, Y., Peng, X. Chemistry of Materials 2004, 16, 3931-3935.
[15]. Peng, X., Thessing, J. Structure and Bonding (Berlin, Germany) 2005, 118, (Semiconductor Nanocrystals and Silicate Nanoparticles), 79-119.
[16]. Penn, R. L., Banfield, J. F. Science (Washington, D.C.) 1998, 281, 969-971.
[17]. Yang, H. G., Zeng, H. C. Angewandte Chemie, International Edition 2004, 43, 5930-5933.
[18]. Yu, J. H., Joo, J., Park, H. M., Baik, S.-I., Kim, Y. W., Kim, S. C., Hyeon, T., Journal of the American Chemical Society 2005, 127, 5662-5670.
[19]. Gur, I., Fromer, N. A., Geier, M. L., Alivisatos, A. P. Science (Washington, D.C., United States) 2005, 310, 462-465.
[20]. Pinna, N., Neri, G., Antonietti, M., Niederberger, M., Angewandte Chemie, International Edition 2004, 43, 4345-4349.
[21]. Manna, L., Milliron, D. J., Meisel, A., Scher, E. C., Alivisatos, A. P., Nature Materials 2003, 2, 382-385.
[22]. Yu, W. W., Wang, Y. A., Peng, X. Chemistry of Materials 2003, 15, 4300-4308.
[23]. Huynh, W. U., Dittmer, J. J., Alivisatos, A. P., Science (Washington, D.C., United States) 2002, 295, 2425-2427.
[24]. Chen, J., Herricks, T., Xia, Y., Angewandte Chemie, International Edition 2005, 44, 2589-2592.
[25]. Liu, B., Zeng, H. C., Journal of the American Chemical Society 2004, 126, 8124-8125.
[26]. Tzitzios, V., Niarchos, D., Gjoka, M., Boukos, N., Petridis, D., Journal of the American Chemical Society 2005, 127, 13756-13757.
[27]. Zitoun, D., Pinna, N., Frolet, N., Belin, C., Journal of the American Chemical Society 2005, 127, 15034-15035.
[28]. Puetz, J., Al-Dahoudi, N., Aegerter, M. A., Advanced Engineering Materials 2004, 6, 733-737.
[29]. Qadri, S. B., Kim, H., Journal of Applied Physics 2002, 92, 227-229.
[30]. Naghavi, N., Marcel, C., Dupont, L., Rougier, A., Leriche, J.-B., Guery, C., Journal of Materials Chemistry 2000, 10, 2315-2319.
[31]. Ederth, J., Johnsson, P., Niklasson, G. A., Hoel, A., Hultaker, A., Heszler, P., Granqvist, C. G., van Doorn, A. R., Jongerius, M. J., Burgard, D., Physical Review B: Condensed Matter and Materials Physics 2003, 68, 155410/1-155410/10.
[32]. Emons, T. T., Li, J., Nazar, L. F., Journal of the American Chemical Society 2002, 124, 8516-8517.
[33]. Williams, D. E., Sensors and Actuators, B: Chemical 1999, 57, 1-16.
[34]. Neri, G., Bonavita, A., Micali, G., Rizzo, G., Galvagno, S., Niederberger, M., Pinna, N., Chemical Communications (Cambridge, United Kingdom) 2005, (48), 6032-6034.
[35]. Zhang, D., Liu, Z., Li, C., Tang, T., Liu, X., Han, S., Lei, B., Zhou, C., Nano Letters 2004, 4, 1919-1924.
[36]. Kim, S.-R., Hong, H.-K., Kwon, C. H., Yun, D. H., Lee, K., Sung, Y. K., Sensors and Actuators, B: Chemical 2000, B66, 59-62.
[37]. Murali, A., Barve, A., Leppert, V. J., Risbud, S. H., Kennedy, I. M., Lee, H. W. H., Nano Letters 2001, 1, 287-289.
[38]. Liu, Q., Lu, W., Ma, A., Tang, J., Lin, J., Fang, J., Journal of the American Chemical Society 2005, 127, 5276-5277.
[39]. Seo, W. S., Jo, H. H., Lee, K., Park, J. T., Advanced Materials (Weinheim, Germany) 2003, 15, 795-797.
[40]. Chen, Y., Kim, M., Lian, G., Johnson, M. B., Peng, X., Journal of the American Chemical Society 2005, 127, 13331-13337.
[41]. Fresenius, W., Huber, J. F. K., Pungor, E., Rechnitz, G. A., Simon, W., West, T. S., Tables of Spectral Data for Structure Determination of Organic Compounds. Second ed., Springer-Verlag: Berlin, 1989.
[42]. Bellamy, L. J., The Infra-red Spectra of Complex Molecules. 3rd ed., Chapman and Hall, New York, 1975.
[43]. Yin, M., O'Brien, S., Journal of the American Chemical Society 2003, 125, 10180-10181.
[44]. Sigma-Aldrich Catalogue 2005.
[45]. Li, L. S., Pradhan, N., Wang, Y., Peng, X., Nano Letters 2004, 4, 2261-2264.
[46]. Battaglia, D., Peng, X., Nano Letters 2002, 2, 1027-1030.
[47]. Pradhan, N., Xu, H., Peng, X., Nano Letters 2006, 6, 720-724.
[48]. Mullin, J. W., Crystallization. 3rd ed., 1997, p 480.
[49]. Gao, B. Z. J., Zhang, X., Xu, B., Angewandte Chemie International edition 2006, 45, 1220.

What is claimed is:

1. A method of synthesizing nanostructures, comprising the steps of:
    a. providing a first mixture and a second mixture, wherein the first mixture contains an amount of a carboxylate salt, and a first amount of a hydrocarbon solvent, and the second mixture contains an amount of an activation reagent and a second amount of the hydrocarbon solvent;
    b. heating the first mixture to a first temperature, T1, and the second mixture to a second temperature, T2, respectively, wherein T1<T2;
    c. injecting the heated first mixture into the heated second mixture at the second temperature T2 to form a reaction mixture; and
    d. incubating the reaction mixture for a period of time effective to grow the nanostructures.

2. The method of claim 1, further comprising the step of degassing the first mixture and the second mixture, respectively.

3. The method of claim 1, wherein the heating step is performed in an argon atmosphere.

4. The method of claim 1, wherein the carboxylate salt comprises cobalt acetate hydrate ($Co(Ac)_2 \cdot 4H_2O$), cobalt myristate ($Co(Mt)_2$), indium acetate ($In(Ac)_3$), indium myristate ($In(Mt)_3$), indium stearate ($In(St)_3$), manganese chloride hydrate ($Mn(Cl)_2 \cdot 4H_2O$), manganese stearate ($Mn(St)_2$), zinc acetate ($Zn(Ac)_2$), or zinc stearate ($Zn(St)_2$).

5. The method of claim 4, wherein $In(Mt)_3$ is synthesized by a process comprising the steps of:
 a. treating an amount of $In(Ac)_3$ with an amount of myristic acid (MA) to form a complex; and
 b. heating the complex to about 140° C. for about six hours to grow $In(Mt)_3$ in an argon atmosphere.

6. The method of claim 1, wherein the activation reagent comprises alcohol or amine, and wherein the alcohol includes decyl alcohol (DA) or 1-octadecyl alcohol (ODA).

7. The method of claim 1, wherein the hydrocarbon solvent comprises 1-octadecene (ODE).

8. The method of claim 1, wherein the first mixture further contains an amount of a fatty acid ligand.

9. The method of claim 8, wherein the fatty acid comprises myristic acid (MA) or stearic acid (SA).

10. The method of claim 1, wherein the first temperature T1 is in the range of about 90-180° C., and wherein the second temperature T2 is in the range of about 170-330° C.

11. The method of claim 10, wherein the period of time effective is in the range of from about 1 minute to about 12 hours.

12. The method of claim 11, wherein the nanostructures are in the form of single crystalline and nearly monodisperse nanocrystals.

13. The method of claim 12, wherein the nanostructures are in the form of dot-shaped nanocrystals having a size in the range of about 1-20 nm.

14. The method of claim 12, wherein the nano structures are in the form of nanoflowers having a size in the range of about 10-100 nm.

15. A method of synthesizing nanostructures, comprising the steps of:
 a. injecting a first mixture at a first temperature, T1, into a second mixture at a second temperature, T2, to form a reaction mixture, wherein the first mixture contains a carboxylate salt and a hydrocarbon solvent, and the second mixture contains an activation reagent and the hydrocarbon solvent; and
 b. incubating the reaction mixture for a period of time effective to grow nanostructures, wherein T1<T2.

16. The method of claim 15, wherein the carboxylate salt comprises $Co(Mt)_2$, $In(Mt)_3$, $In(St)_3$, $Mn(St)_2$, or $Zn(St)_2$.

17. The method of claim 15, wherein the activation reagent comprises alcohol or amine, and wherein the alcohol includes decyl alcohol (DA) or 1-octadecyl alcohol (ODA).

18. The method of claim 15, wherein the hydrocarbon solvent comprises 1-octadecene (ODE).

19. The method of claim 15, wherein the first temperature T1 is in the range of about 90-180° C., and wherein the second temperature T2 is in the range of about 170-330° C.

20. The method of claim 19, wherein the period of time is in the range of from about 1 minute to about 12 hours.

21. The method of claim 20, wherein the nanostructures are in the form of single crystalline and nearly monodisperse nanocrystals.

22. A method of synthesizing nanostructures, comprising the steps of:
 a. providing a first mixture and a second mixture, wherein the first mixture contains an amount of a carboxylate salt, and an amount of a fatty acid ligand and a first amount of a hydrocarbon solvent, and wherein the second mixture contains an amount of an activation reagent and a second amount of the hydrocarbon solvent;
 b. heating the first mixture to a first temperature, T1, and the second mixture to a second temperature, T2, respectively, wherein T1<T2;
 c. injecting the heated second mixture into the heated first mixture at the second temperature T2 to form a reaction mixture; and
 d. incubating the reaction mixture for a period of time effective to grow the growth of desired nanostructures.

23. The method of claim 22, further comprising the step of degassing the first mixture and the second mixture, respectively.

24. The method of claim 22, wherein the heating step is performed in an argon atmosphere.

25. The method of claim 22, wherein the carboxylate salt comprises cobalt acetate hydrate ($Co(Ac)_2 \cdot 4H_2O$), cobalt myristate ($Co(Mt)_2$), indium acetate ($In(Ac)_3$), indium myristate ($In(Mt)_3$), indium stearate ($In(St)_3$), manganese acetate hydrate ($Mn(Ac)_2 \cdot 4H_2O$), manganese stearate ($Mn(St)_2$), zinc acetate ($Zn(Ac)_2$), or zinc stearate ($Zn(St)_2$).

26. The method of claim 22, wherein the fatty acid ligand comprises myristic acid (MA) or stearic acid (SA).

27. The method of claim 22, wherein the activation reagent comprises alcohol or amine, and wherein the alcohol includes decyl alcohol (DA) or 1-octadecyl alcohol (ODA).

28. The method of claim 22, wherein the hydrocarbon solvent comprises 1-octadecene (ODE).

29. The method of claim 22, wherein the first temperature T1 is in the range of about 90-180° C., and wherein the second temperature T2 is in the range of about 170-330° C.

30. The method of claim 29, wherein the period of time effective is in the range of from about 1 minute to about 12 hours.

31. The method of claim 22, wherein the reaction mixture is characterizable with a critical ligand protection, $\mu$, associating with the chemical structure of the carboxylate salt, and wherein a molar ratio of the fatty acid ligand to the carboxylate salt is defined by $\alpha = L/P$ such that $\alpha < \mu$, and the reaction mixture is in a limited ligand protection (LLP) domain.

32. The method of claim 31, wherein the nanostructures are in the form of single crystalline and nearly monodisperse nanocrystals.

33. The method of claim 32, wherein the nanostructures are in the form of nanoflowers.

34. A method of synthesizing nanostructures, comprising the step of heating a first mixture to an elevated temperature, T1, for a period of time effective to allow the growth of nanostructures, wherein the first mixture contains a carboxylate salt and a hydrocarbon solvent, and injecting a second mixture into the heated first mixture at an elevated temperature T2, wherein the second mixture contains an activation reagent and the hydrocarbon solvent, wherein T1<T2.

35. The method of claim 34, wherein the carboxylate salt comprises $Co(Mt)_2$, $In(Mt)_3$, $In(St)_3$, $Mn(St)_2$, or $Zn(St)_2$.

36. The method of claim 34, wherein the first mixture further contains a fatty acid ligand including myristic acid (MA) or stearic acid (SA).

37. The method of claim 34, wherein the activation reagent comprises alcohol or amine, and wherein the alcohol includes decyl alcohol (DA) or 1-octadecyl alcohol (ODA).

38. The method of claim 34, wherein the hydrocarbon solvent comprises 1-octadecene (ODE).

39. The method of claim 34, wherein the elevated temperature T is in the range of about 170-330° C.

40. The method of claim 34, wherein the nanostructures are in the form of single crystalline and nearly monodisperse nanocrystals.

41. The method of claim 22, wherein the reaction mixture is characterizable with a critical ligand protection, $\mu$, associating with the chemical structure of the carboxylate salt, and wherein a molar ratio of the fatty acid ligand to the carboxylate salt is defined by $\alpha = L/P$ such that $\alpha > \mu$, and the reaction mixture is in a sufficient ligand protection (SLP) domain.

42. The method of claim 41, wherein the nanostructures are in the form of single crystalline and nearly monodisperse nanocrystals.

43. The method of claim 41, wherein the nanostructures are in the form of dot-shaped nanocrystals.

* * * * *